(12) United States Patent
Liang

(10) Patent No.: US 10,474,335 B2
(45) Date of Patent: Nov. 12, 2019

(54) IMAGE SELECTION FOR SETTING AVATARS IN COMMUNICATION APPLICATIONS

(71) Applicant: SAMSUNG ELECTRONICS CO., LTD., Suwon-si (KR)

(72) Inventor: Shilong Liang, Guangdong (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 561 days.

(21) Appl. No.: 14/838,728

(22) Filed: Aug. 28, 2015

(65) Prior Publication Data

US 2016/0062611 A1    Mar. 3, 2016

(30) Foreign Application Priority Data

Aug. 28, 2014 (CN) .......................... 2014 1 0431263
Jul. 13, 2015 (KR) ........................ 10-2015-0099219

(51) Int. Cl.
*G06F 3/0484* (2013.01)
*G06F 3/0488* (2013.01)
(Continued)

(52) U.S. Cl.
CPC ........ G06F 3/04842 (2013.01); G06F 3/0412 (2013.01); G06F 3/0482 (2013.01);
(Continued)

(58) Field of Classification Search
CPC .. G06F 3/0412; G06F 3/04817; G06F 3/0482; G06F 3/04842; G06F 3/0486; G06F 3/0488; G06Q 10/10; G06Q 50/01; G09G 2340/12; G09G 2340/0407; H04L 12/1813; H04L 12/581; H04M 1/27455; H04M 1/72583
See application file for complete search history.

(56) References Cited

U.S. PATENT DOCUMENTS

| 7,480,872 | B1 | 1/2009 | Ubillos |
| 2004/0150648 | A1* | 8/2004 | Kim .......................... H04N 5/20 345/581 |

(Continued)

FOREIGN PATENT DOCUMENTS

| CN | 101237557 A | 8/2008 |
| CN | 101605168 A | 12/2009 |

(Continued)

OTHER PUBLICATIONS

Bardon et al., "Translucent Drag Icons," IBM, Technical Disclosure Bulletin, vol. 38 No. 02, Feb. 1995, pp. 609-610 (retrieved from IP.com on Feb. 2, 2019). 2 pages (plus cover) (Year: 1995).*

(Continued)

*Primary Examiner* — Eric J. Bycer
(74) *Attorney, Agent, or Firm* — Sughrue Mion, PLLC

(57) ABSTRACT

A method of displaying an image includes: receiving a user input of selecting an image displayed on a display included in the communication device; selecting an image according to the user input; and activating an application using the selected image when the selected image is displayed on a foreground of the display, and displaying the selected image and the activated application to overlap with each other.

20 Claims, 30 Drawing Sheets

(51) Int. Cl.
*G06F 3/041* (2006.01)
*G06F 3/0481* (2013.01)
*G06F 3/0482* (2013.01)
*G06F 3/0486* (2013.01)
*H04L 12/58* (2006.01)
*H04M 1/2745* (2006.01)
*G06Q 10/10* (2012.01)
*H04L 12/18* (2006.01)
*H04M 1/725* (2006.01)

(52) U.S. Cl.
CPC .......... *G06F 3/0486* (2013.01); *G06F 3/0488* (2013.01); *G06F 3/04817* (2013.01); *G06Q 10/10* (2013.01); *G09G 2340/0407* (2013.01); *G09G 2340/12* (2013.01); *H04L 12/1813* (2013.01); *H04L 51/04* (2013.01); *H04M 1/27455* (2013.01); *H04M 1/72583* (2013.01)

(56) References Cited

U.S. PATENT DOCUMENTS

| | | | |
|---|---|---|---|
| 2006/0048069 A1* | 3/2006 | Igeta | G06F 3/0486 715/769 |
| 2006/0148455 A1* | 7/2006 | Kim | H04M 1/27455 455/414.1 |
| 2007/0035513 A1* | 2/2007 | Sherrard | G06F 3/04817 345/157 |
| 2007/0086773 A1* | 4/2007 | Ramsten | G06F 3/0482 396/287 |
| 2007/0259654 A1* | 11/2007 | Oijer | H04L 51/38 455/415 |
| 2007/0294630 A1* | 12/2007 | Duncan | G06F 17/24 715/764 |
| 2008/0052945 A1 | 3/2008 | Matas et al. | |
| 2008/0261569 A1* | 10/2008 | Britt | G06Q 10/107 455/414.1 |
| 2008/0309617 A1* | 12/2008 | Kong | G06F 3/04817 345/157 |
| 2009/0222766 A1* | 9/2009 | Chae | G06F 3/04817 715/835 |
| 2009/0259959 A1* | 10/2009 | Grotjohn | G06F 3/04817 715/769 |
| 2009/0285477 A1* | 11/2009 | Wu | H04M 1/2745 382/165 |
| 2010/0017734 A1* | 1/2010 | Cummins | G06F 3/0486 715/769 |
| 2010/0081475 A1* | 4/2010 | Chiang | G06F 3/0483 455/564 |
| 2011/0047187 A1* | 2/2011 | Sinha | G06F 9/543 707/802 |
| 2011/0202853 A1* | 8/2011 | Mujkic | H04L 51/043 715/753 |
| 2011/0225539 A1* | 9/2011 | Lee | G06F 3/0485 715/784 |
| 2012/0054657 A1 | 3/2012 | Nurmi | |
| 2012/0162213 A1 | 6/2012 | Shim et al. | |
| 2012/0289290 A1* | 11/2012 | Chae | G06F 3/0488 455/566 |
| 2013/0024795 A1* | 1/2013 | Robotham | G06F 3/0486 715/769 |
| 2013/0067035 A1 | 3/2013 | Amanat et al. | |
| 2013/0113748 A1 | 5/2013 | Ishizaki et al. | |
| 2013/0227457 A1* | 8/2013 | Kim | G06F 3/04845 715/769 |
| 2013/0298060 A1 | 11/2013 | Hoyer | |
| 2013/0332840 A1 | 12/2013 | Roth et al. | |
| 2013/0332872 A1* | 12/2013 | Grinberg | G06F 3/0486 715/769 |
| 2014/0109004 A1* | 4/2014 | Sadhvani | G06F 3/0482 715/810 |
| 2014/0337723 A1* | 11/2014 | Van Tol | G06T 11/001 715/275 |
| 2014/0344757 A1* | 11/2014 | Shin | G06F 3/04842 715/835 |
| 2018/0131998 A1 | 5/2018 | Morris et al. | |
| 2018/0210634 A1 | 7/2018 | Kim et al. | |

FOREIGN PATENT DOCUMENTS

| | | |
|---|---|---|
| CN | 102361493 A | 2/2012 |
| CN | 102567937 A | 7/2012 |
| CN | 102577306 A | 7/2012 |
| CN | 102662659 A | 9/2012 |
| CN | 103207729 A | 7/2013 |
| CN | 103336647 A | 10/2013 |
| CN | 103473027 A | 12/2013 |
| CN | 103823621 A | 5/2014 |
| CN | 103945275 A | 7/2014 |
| EP | 2631790 A1 | 8/2013 |

OTHER PUBLICATIONS

Communication dated Jan. 8, 2016, issued by the European Patent Office in counterpart European Application No. 15182764.9.
Communication dated Feb. 3, 2017, issued by the State Intellectual Property Office of P.R. China in counterpart Chinese application No. 201410431263.8.
Communication dated Oct. 24, 2017, issued by the State Intellectual Property Office of P.R. China in counterpart Chinese application No. 201410431263.8.
Communication dated Apr. 23, 2018, issued by the State Intellectual Property Office of P.R. China in counterpart Chinese application No. 201410431263.8.
Huizi5189, "How to set a phone contact avatar", Nov. 30, 2012, https://zhidao.baidu.com/question/503139356.html, 2 pages total.
Bataqq2005, "reference drawing software SETUNA", Sep. 11, 2012, https://tieba.baidu.com/p/1853282834, 9 pages total.

* cited by examiner

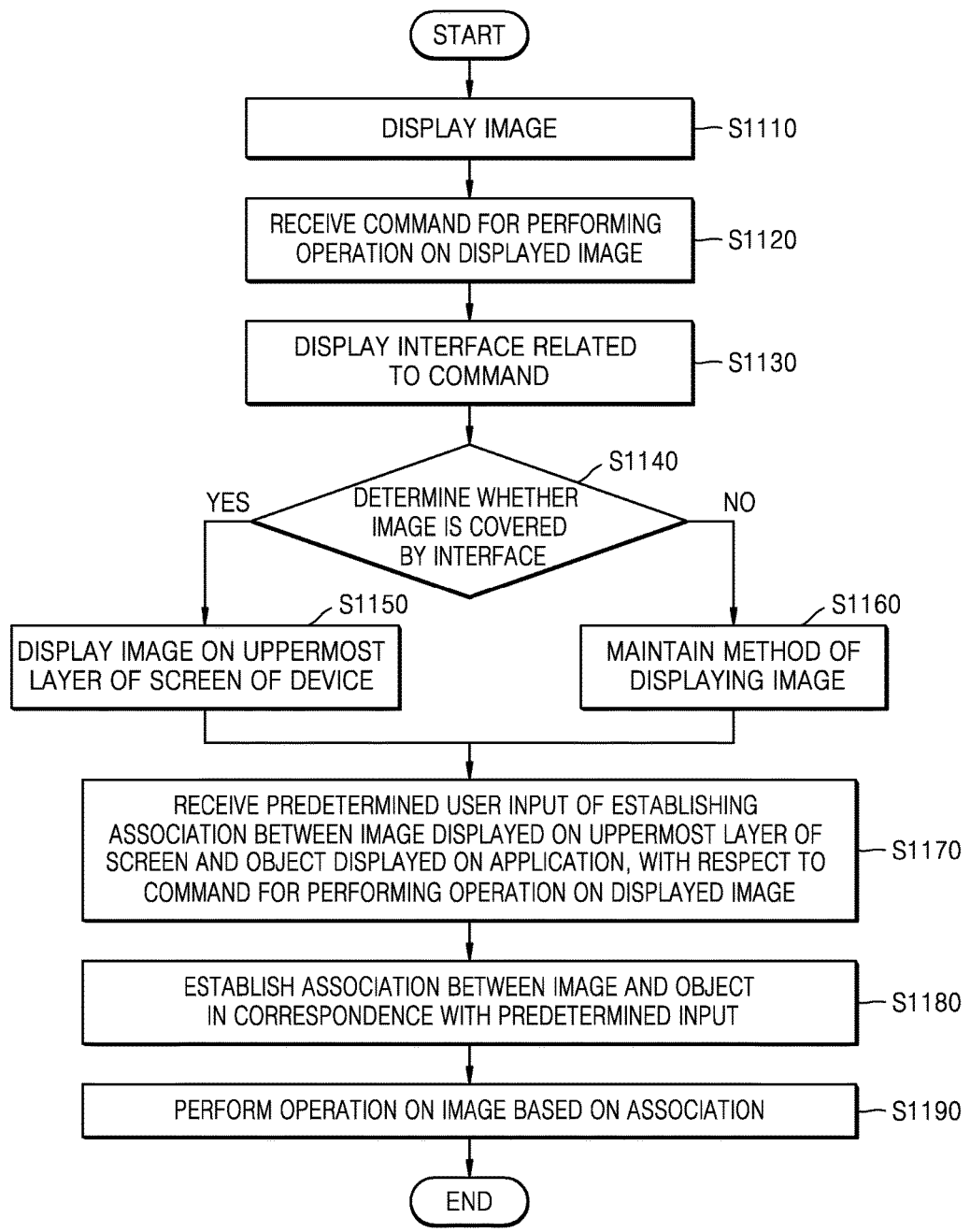

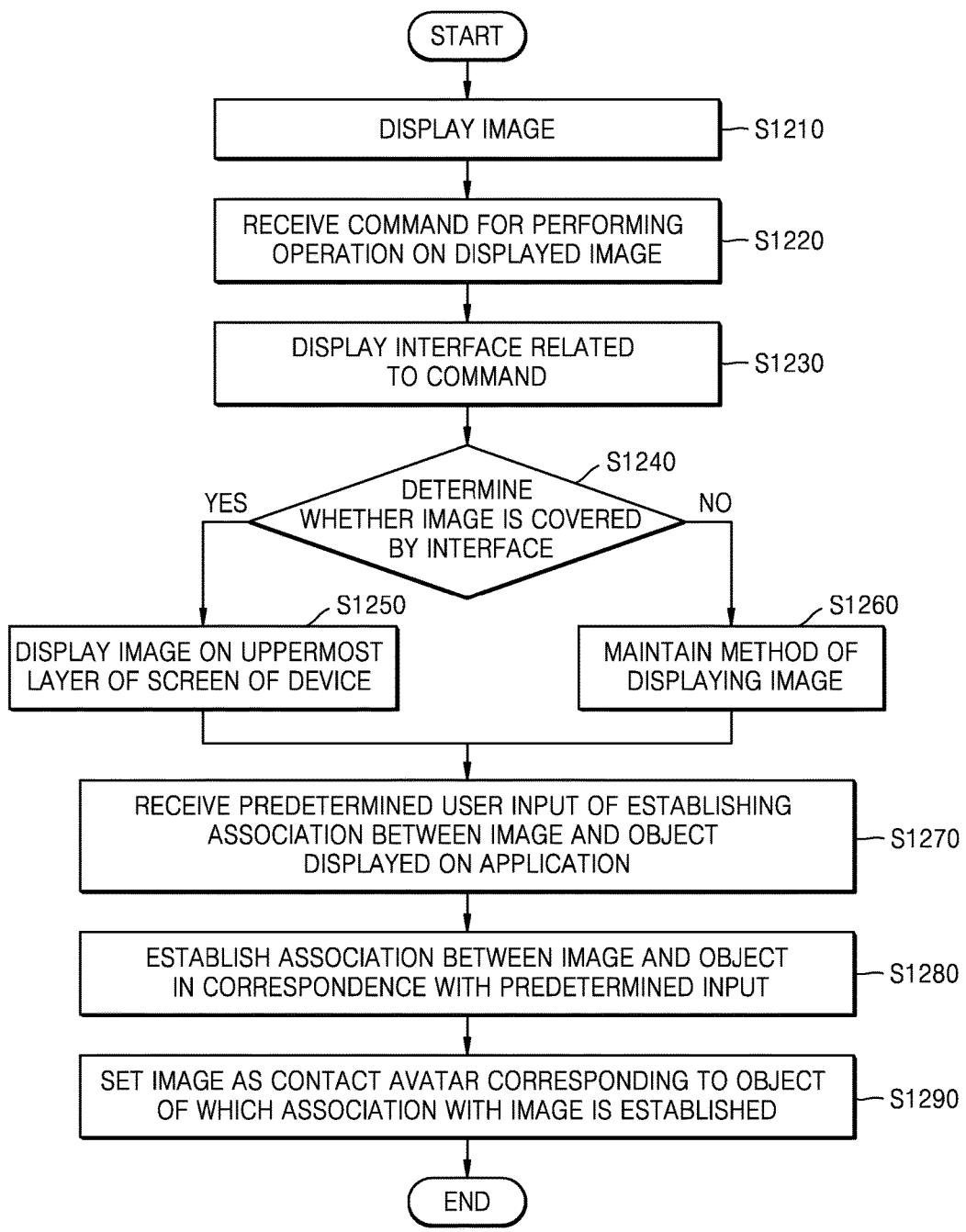

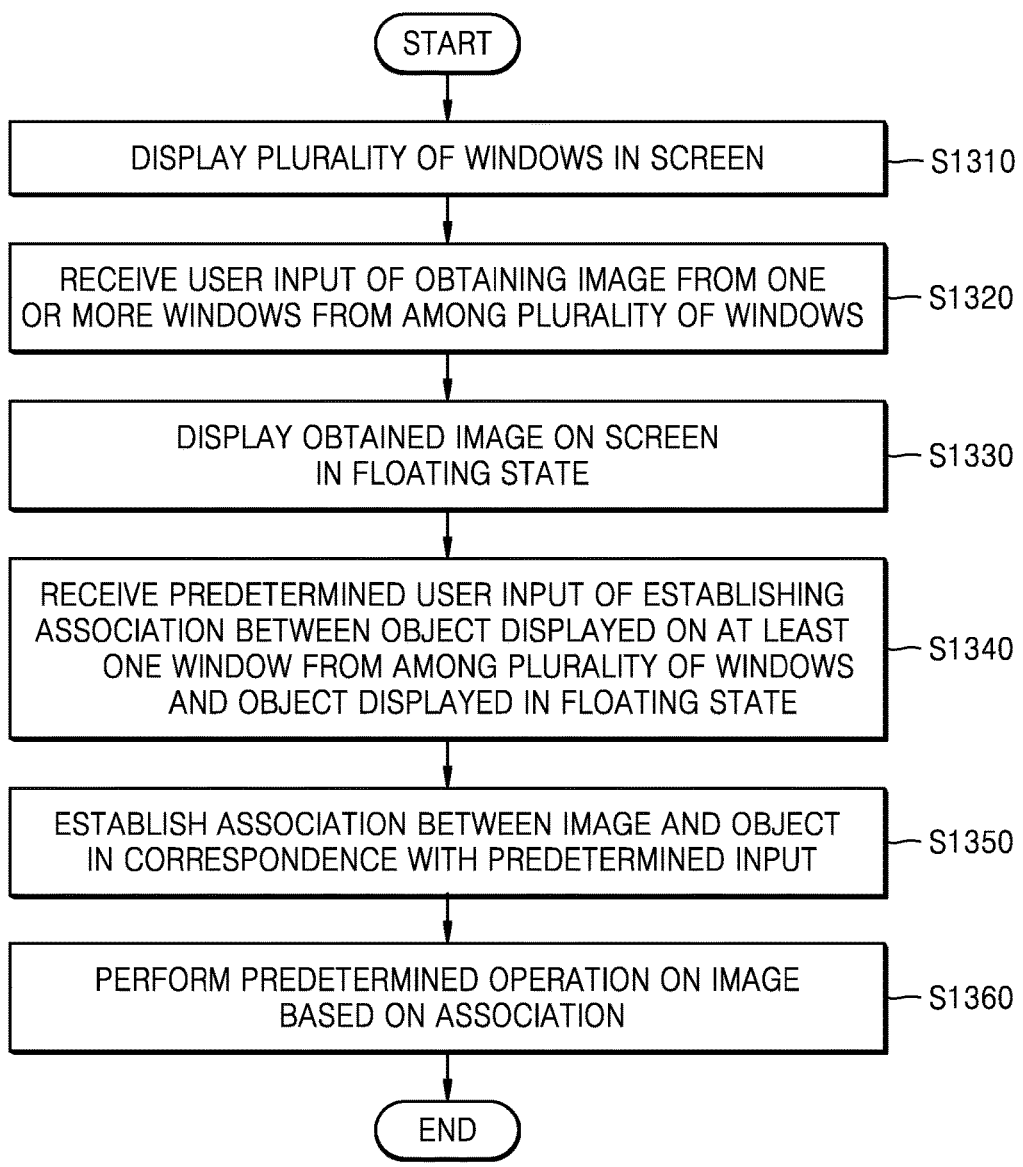

IMAGE SELECTION FOR SETTING AVATARS IN COMMUNICATION APPLICATIONS

CROSS-REFERENCE TO RELATED APPLICATIONS

This application claims priority from Application No. 201410431263.8, filed on Aug. 28, 2014, in the State Intellectual Property Office (SIPO) of the People's Republic of China and Korean Patent Application No. 10-2015-0099219, filed on Jul. 13, 2015, in the Korean Intellectual Property Office, the disclosures of which are incorporated herein by reference in their entireties.

BACKGROUND

1. Field

Apparatuses and methods consistent with exemplary embodiments relate to methods and devices for displaying an image, and more particularly, to methods and devices for displaying a predetermined image on an uppermost layer of a screen.

2. Description of the Related Art

Due to the advancement of technology, a smartphone, a personal computer (PC), a table PC, a game device, a personal digital assistance (PDA), a digital multimedia player, and the like, are used more often in people's lives. Most of these devices provide a function of processing and displaying an image.

Additionally, most of these devices provide an interface for processing an image based on a user input. If an image is processed based on a user input, it may be useful to implement an interface that is easy to use.

Accordingly, there is a need for an image displaying method that a user may easily and intuitively use to process an image.

SUMMARY

Provided are methods and devices for displaying an image.

Additional aspects will be set forth in part in the description which follows and, in part, will be apparent from the description, or may be learned by practice of the presented exemplary embodiments.

According to an aspect of an exemplary embodiment, there is provided a communication device configured to display an image, the communication device including: a display; a user interface configured to receive a user input for selecting an image that is displayed on the display; and a controller configured to select the image according to the user input, activate an application using the selected image while the selected image is displayed in a foreground of the display, and control the display to display the selected image and the activated application overlapping each other.

The application may include a communication application that is used for communicating with an external device.

The controller may be further configured to determine one or more contact information items from a plurality of contact information items included in a contact information list displayed via the communication application, based on a selecting input obtained via the user interface, and sets the selected image as an avatar image to identify the determined contact information item.

The display may be configured to display the determined contact information item that includes the set avatar image.

The controller may be further configured to determine a background color of the selected image by using a predetermined method, edit the selected image by using the determined background color, and set the edited image as the avatar image.

The user interface may be configured to receive an image-selecting input for selecting a part of a screen or a whole area of the screen of the communication device, and the controller is further configured to select the image of the selected part of the screen or the selected whole area of the screen which is determined based on the received image-selecting input.

The user interface may be configured to receive an object selection input of selecting at least one of a plurality of object images displayed on the display, and the controller is configured to obtain the selected at least one object image based on the received object selection input.

The display may be configured to display the selected image on an uppermost layer of a screen of the communication device.

The user input may include an input of selecting a part of a screen or a whole area of the screen displayed on the display.

The controller may be further configured to select the selected image by selecting a part of a screen or a whole area of the screen displayed on the display according to the user input, and editing an image in the selected part of the screen or the selected whole area of the screen.

The editing of the image may include at least one selected from the group consisting of an operation of resizing the image in the selected part of the screen or the selected whole area of the screen and an operation of resetting a width-to-length ratio of the image in the selected part of the screen or the selected whole area of the screen.

According to an aspect of another exemplary embodiment, there is provided a method of displaying an image, which is performed by a communication device, the method including: receiving a user input of selecting an image displayed on a display included in the communication device; selecting the image according to the user input; and activating an application using the selected image while the selected image is displayed on a foreground of the display, and displaying the selected image and the activated application overlapping each other.

The application may include a communication application that is used for communicating with an external device.

The method may include determining one or more contact information items, from a plurality of contact information items included in a contact information list displayed via the communication application, based on the user input, and setting the selected image as an avatar image to identify the determined contact information item.

The method may include displaying the determined contact information item that includes the set avatar image.

The setting the selected image as the avatar image may include: determining a background color of the selected image by using a predetermined method, editing the selected image by using the determined background color, and setting the edited image as the avatar image.

The user input may include selecting a part of a screen or a whole area of the screen displayed on the display.

The user input may include an input of selecting at least one of a plurality of object images displayed on the display, and the selected at least one image includes an object image selected according to the user input.

The displaying of the selected image and the activated application overlapping each other may include displaying the selected image on an uppermost layer of the display.

BRIEF DESCRIPTION OF THE DRAWINGS

These and/or other aspects will become apparent and more readily appreciated from the following description of exemplary embodiments, taken in conjunction with the accompanying drawings in which:

FIG. 11 is a flowchart of a method of establishing an association between an obtained image and an object displayed on an application and performing an operation on the obtained image based on the established association according to an exemplary embodiment;

FIG. 12 is a flowchart of a method of establishing an association between an obtained image and an object displayed on an application and setting the obtained image as a contact avatar based on the established association according to an exemplary embodiment;

FIG. 13 is a flowchart of a method of obtaining an image from a plurality of windows and displaying the obtained image according to an exemplary embodiment;

DETAILED DESCRIPTION

Figure 1:
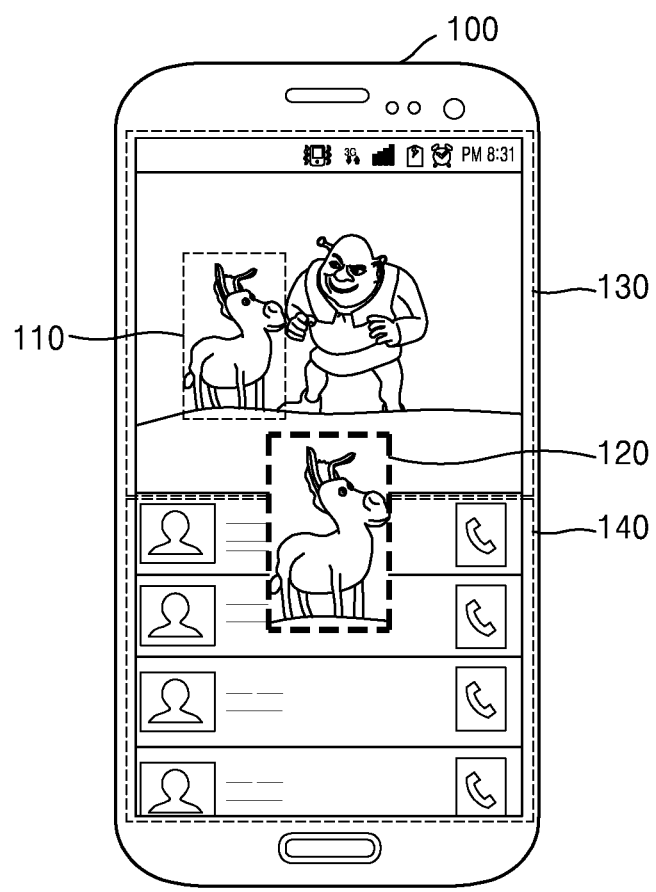
FIG. 1 is a diagram illustrating an example of displaying an image according to an exemplary embodiment.

Reference will now be made in detail to exemplary embodiments, examples of which are illustrated in the accompanying drawings, wherein like reference numerals refer to like elements throughout. One or more exemplary embodiments may have different forms and should not be construed as being limited to the descriptions set forth herein. Accordingly, exemplary embodiments are described below, by referring to the figures. As used herein, the term "and/or" includes any and all combinations of one or more of the associated listed items. Expressions such as "at least one of," when preceding a list of elements, modify the entire list of elements and do not modify the individual elements of the list. Exemplary embodiments are provided so that the present disclosure will be thorough and complete, and will fully convey the concepts to those skilled in the art, and the scope of exemplary embodiments should be defined by the appended claims.

General and widely-used terms have been employed herein, in consideration of functions, and may vary according to an intention of one of ordinary skill in the art, a precedent, or emergence of new technologies. Additionally, in some cases, an applicant may select specific terms, in which the applicant may provide the meaning of the terms in the description. Accordingly, It will be understood that the terms, used herein, should be interpreted as having a meaning that is consistent with their meaning in the context of the relevant art and will not be interpreted in an idealized or overly formal sense unless expressly so defined herein.

It should be further understood that the terms "comprises," "comprising," "includes," and/or "including," when used herein, specify the presence of components, but do not preclude the presence or addition of one or more other components, unless otherwise specified. Additionally, a term 'unit' may include software or hardware components such as field programmable gate array (FPGA) or application-specific integrated circuit (ASIC), and a "unit" performs some functions. However, a "unit" is not limited to hardware or software. A "unit" may be configured to be included in a storage medium that may be addressed, or configured to play one or more processors. Accordingly, as an example, a "unit" includes components such as software components, object-oriented software components, class components, or task components, processes, functions, attributes, procedures, subroutines, segments of a program code, drivers, firmware, micro-codes, circuits, data, database, data structures, tables, arrays, or variables. Functions provided in components or "units" may be combined into a small number of components or "units", or separated into additional components or "units".

It will be understood that when an element is referred to as being "connected to" or "coupled to" another element, it may be "directly connected or coupled" to the other element, or "electrically connected to" the other element with intervening elements therebetween.

A "user input" described herein may include at least one selected from the group consisting of a touch input, a keyboard input, a voice input, a sound input, a button input, a gesture input, and a multimodal input, but it is not limited thereto.

A "touch input" used herein may refer to a touch gesture that a user performs on a touchscreen or a cover to control a device 100. For example, a touch input described herein may include at least one of a tap, a touch and hold, a double-tap, a drag, panning, a flick, and a drag-and-drop, but is not limited thereto.

A "button input" used herein may refer to an input that a user performs to control the device 100 by using a physical button provided with the device 100.

Additionally, a "multimodal input" refers to an input in which at least two input methods are combined. For example, the device 100 may receive a touch input and a gesture input from a user, or receive a touch input and a voice input from the user.

One or more exemplary embodiments will now be described more fully with reference to the accompanying drawings. The inventive concept should not be construed as being limited to the exemplary embodiments set forth herein. In the description, some detailed explanations of the related art may be omitted if they unnecessarily obscure the description.

FIG. 1 is a diagram illustrating an example of displaying an image according to an exemplary embodiment;

Referring to FIG. 1, the device 100 may receive an input of selecting an area 110 of a screen of the device 100, and display an image 120 that is obtained from the selected area 110 of the screen, which is determined according to the selecting input, on an uppermost layer of the screen of the device 100. The obtained image 120, which is displayed on the uppermost layer, may be displayed to partially overlap with an area on which other screens such as a graphic screen 130 and a contact information list screen 140 are displayed.

Displaying a second screen on a layer above a layer of a first screen may include displaying the second screen to cover the first screen. For example, displaying the obtained image 120 on a layer above a layer of the contact information list screen 140 may refer to displaying the obtained image 120 to cover the contact information list screen 140.

Displaying the obtained image 120 on the uppermost layer may refer to displaying the obtained image 120 on the uppermost layer of the screen of the device 100. For example, if the obtained image 120 (e.g., selected image) is displayed on the uppermost layer, the obtained image 120 may be displayed to partially cover the graphic screen 130 and the contact information list screen 140.

The device 100 may be a smartphone, a tablet personal computer (PC), a PC, a smart TV, a cellular phone, a personal digital assistant (PDA), a laptop computer, a media player, a micro server, a global positioning system (GPS), an e-book terminal, a digital broadcasting terminal, a navigation system, a kiosk, a moving pictures expert group audio layer 3 (MP3) player, a digital camera, or other mobile or non-mobile apparatuses, but it is not limited thereto.

Additionally, the device 100 may include a communication device used for communication.

Figure 2:
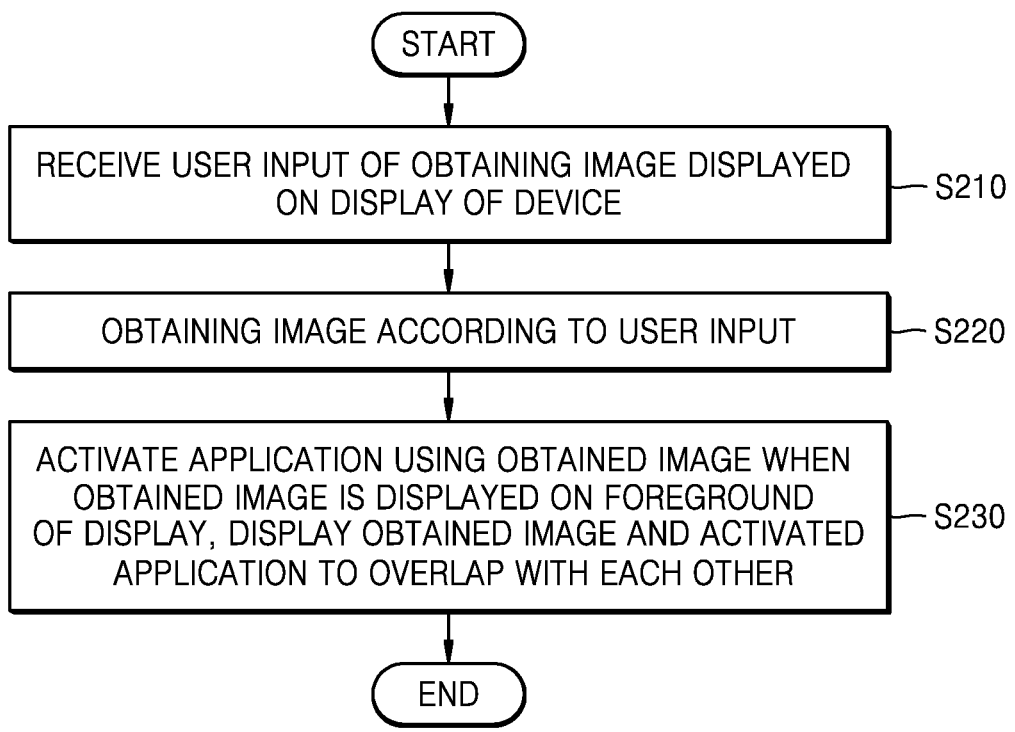
FIG. 2 is a flowchart of a method of displaying an image according to an exemplary embodiment.

FIG. 2 is a flowchart of a method of displaying an image according to an exemplary embodiment.

In operation S210, according to an exemplary embodiment, the device 100 receives a user input for obtaining an image displayed on a display included in the device 100.

According to an exemplary embodiment, the device 100 may receive a user input. A user input may refer to an input received from a user. For example, a user input may include at least one selected from the group consisting of a touch input, a keyboard input, a sound input, and a button input. As another example, a user input may include a touch input or a drag input via a mouse input. As another example, a user input may include an input of selecting one of a plurality of object images displayed on the display included in the device 100.

In operation S220, according to an exemplary embodiment, the device 100 may obtain an image based on the user input received in operation S210. For example, the device 100 may receive an input selecting a certain area of the screen of the device 100, and obtain an image displayed on the area selected based on the received selecting input. As another example, the device 100 may obtain an object image selected according to an input of selecting one of a plurality of object images displayed on the display included in the device 100.

In operation S230, according to an exemplary embodiment, the device 100 activates an application when the image obtained in operation S220 is displayed on a foreground of the display included in the device 100, and displays the activated application to overlap with the obtained image. The activated application may be an application that uses the image obtained in operation S220.

Activation may refer to being selected by a user input. For example, if a first application is selected from among the first application and a second application according to a user's click input, the first application may be displayed on a layer above a layer of the second application.

According to an exemplary embodiment, the device 100 may display the image, obtained in operation S220, on the display. If the device 100 displays the activated application when the obtained image is displayed on the foreground of the screen, the device 100 may display the obtained image to overlap with the activated application.

The activated application may be determined from among one or more applications, based on a user input. For example, the device 100 may determine a phone call application, used for a phone call, as an application using the image obtained in operation S220, and display the determined phone call application.

According to an exemplary embodiment, the device 100 may display the image, obtained in operation S220, to overlap with an area on which the activated application is displayed.

For example, the device 100 may display the obtained image, obtained in operation S220, to overlap with an area on which the phone call application that is the activated application is displayed. The image obtained in operation S220, instead of the phone call application, may be displayed on an area in which an area on which the phone call application is displayed overlaps with an area on which the obtained image is displayed. Alternately, the obtained image may be displayed translucently on an area in which the obtained image overlaps with the phone call application.

Additionally, the activated application may be an application that uses the image obtained in operation S220. For example, if the activated application is the phone call application, the image obtained in operation S220 may be used as an image representing a contact information item, from among contact information items included in the phone call application.

Figure 3:
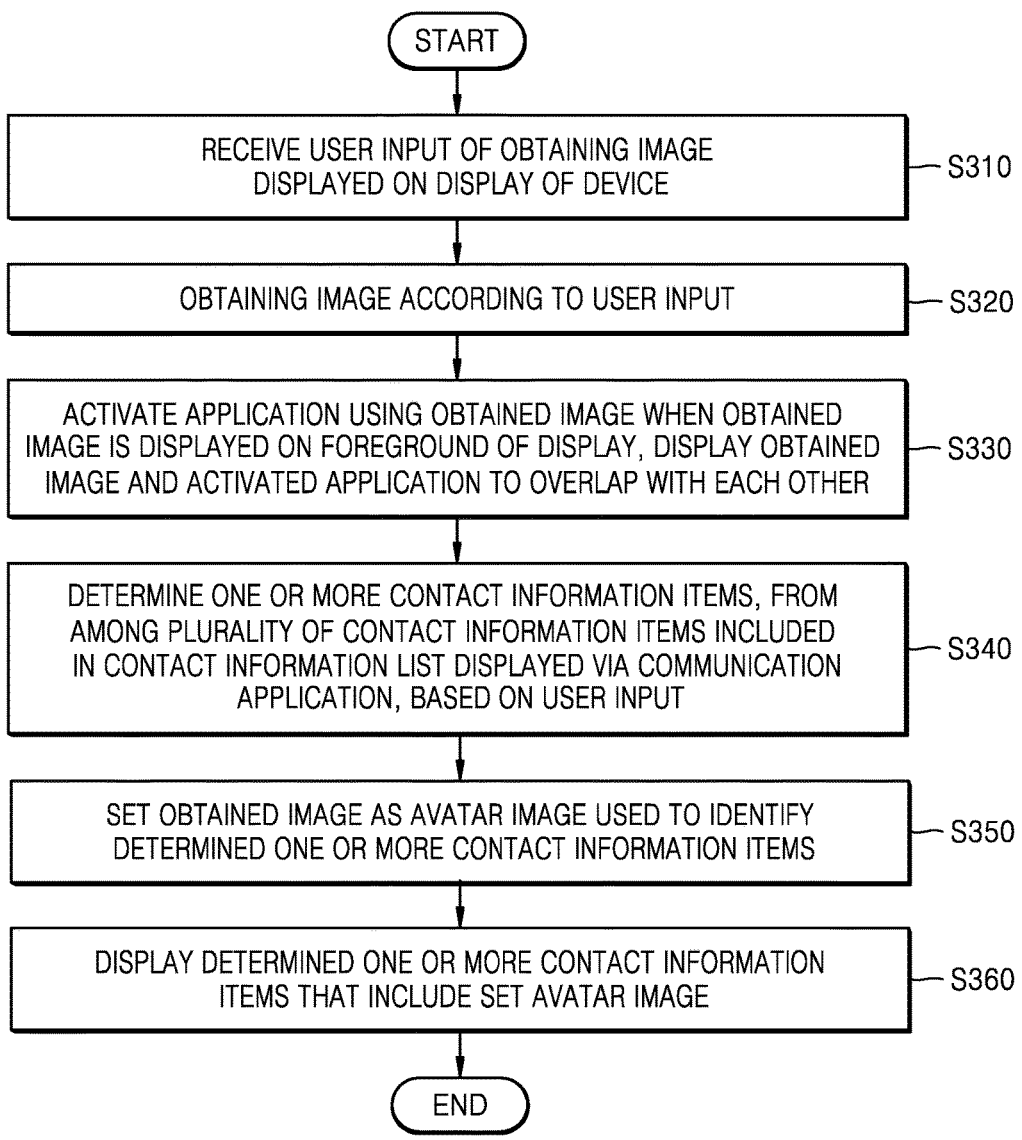
FIG. 3 is a flowchart of a method of displaying an obtained image with respect to a contact information item according to an exemplary embodiment.

FIG. 3 is a flowchart of a method of displaying an obtained image with respect to a contact information item according to an exemplary embodiment.

Operations S310, S320, and S330 correspond to operations S210 through S230. Thus, detailed descriptions thereof will not be provided here again.

In operation S340, according to an exemplary embodiment, the device 100 determines one or more contact information items, from among a plurality of contact information items included in a contact information list displayed via a user communication application.

According to an exemplary embodiment, the device 100 may display the user communication application. The device 100 may display a plurality of contact information items via the user communication application. One or more plurality of contact information items, from among the displayed plurality of contact information items, may be determined based on a user input. For example, one contact information item may be selected from among the plurality of contact information items according to a touch input by a user.

In operation S350, according to an exemplary embodiment, the device 100 sets an image obtained in operation S310 as an avatar image used to identify the contact information item determined in operation S340.

A contact information item may include a representative image representing the contact information item. For example, a contact information item may include an image and contact information. An image representing a contact information item may be an avatar image. According to an exemplary embodiment, the device 100 may determine the image obtained in operation S340 as an avatar image used to identify the contact information item determined in operation S340. The displayed contact information item may include the image obtained in operation S310.

An avatar image may refer to an image representing a certain object. For example, according to an exemplary embodiment, the avatar image may refer to a contact information item. If a character image is used as an image representing contact information, the character image may be an avatar image representing the contact information.

In operation S360, according to an exemplary embodiment, the device 100 displays the contact information item that is determined in operation S340 and includes the avatar image set in operation S350.

Figure 4:
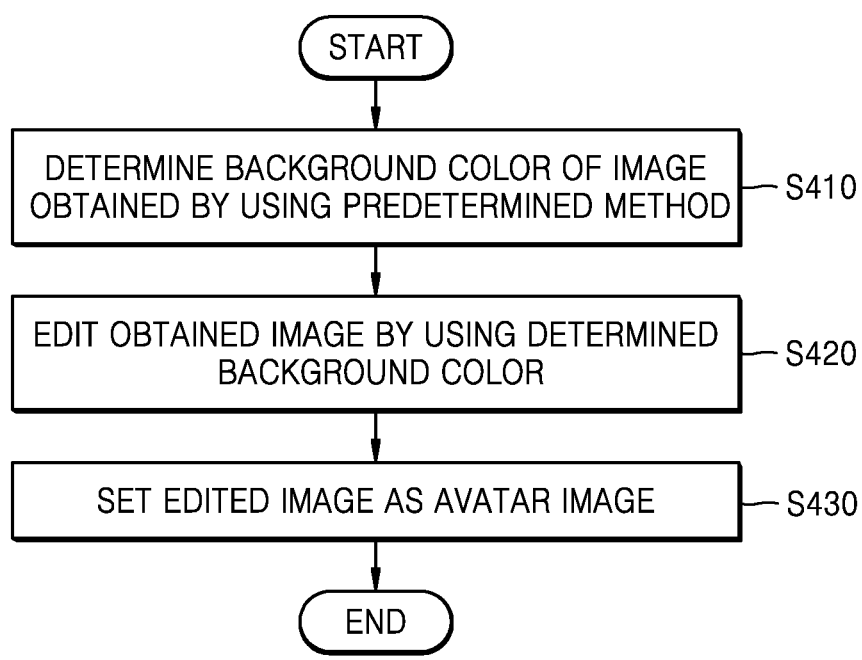
FIG. 4 is a flowchart of a method of editing an obtained image by using a background color and displaying the edited image according to an exemplary embodiment.

FIG. 4 is a flowchart of a method of editing an obtained image by using a background color and displaying the edited image according to an exemplary embodiment.

In operation S410, according to an exemplary embodiment, the device 100 determines a background color of the obtained image by using a predetermined method.

According to an exemplary embodiment, the device 100 may determine a background color of the obtained image. For example, the device 100 may determine a background color of the obtained image based on a color of an outermost area or border area of the obtained image. For example, if a color of an outermost area or border area of the obtained image is white, the device 100 may determine white as a background color of the obtained image.

An exemplary embodiment related to operation S410 will be described below with reference to FIG. 14.

In operation S420, according to an exemplary embodiment, the device 100 edits the obtained image by using the background color determined in operation S410.

For example, the device 100 may edit the obtained image to have a predetermined size by filling the background of the obtained image with the background color determined in operation S410. The predetermined size may be a size of an avatar image included in a contact information item.

As another example, if the image obtained by the device 100 has a size of 100×100 pixels and the determined background color is white, the device 100 may edit the obtained image to have a size of 200×200 pixels by filling the background of the obtained image with white.

In operation S430, according to an exemplary embodiment, the device 100 may set the image, edited in operation S420, as an avatar image.

For example, according to an exemplary embodiment, the device 100 may determine a contact information item from among a plurality of contact information items based on a user input, and substitute an avatar image included in the determined contact information item with the image edited in operation S420. The device 100 may display the edited image on an area on which the avatar image included in the determined contact information item is displayed.

Figure 5:
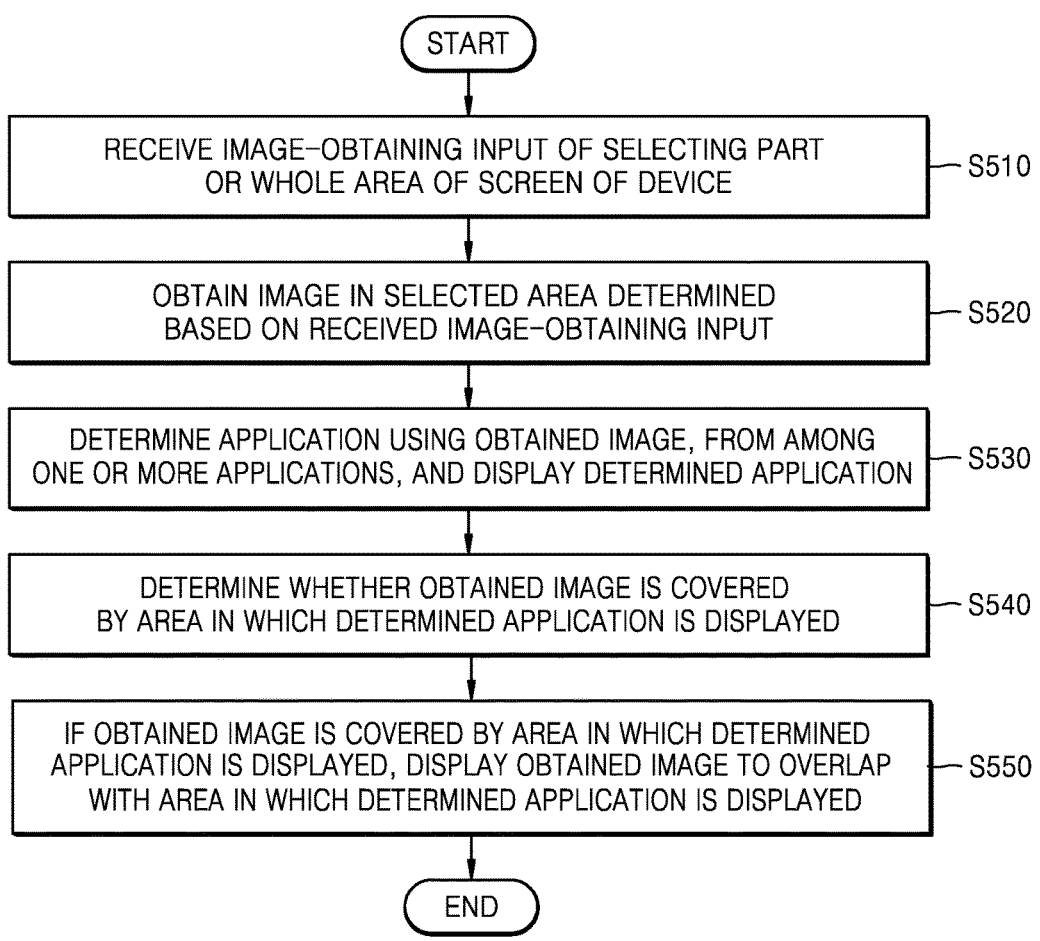
FIG. 5 is a flowchart of a method of displaying an obtained image on an application to overlap with the application according to an exemplary embodiment.

FIG. 5 is a flowchart of a method of displaying an obtained image on an application to overlap with the application according to an exemplary embodiment.

In operation S510, according to an exemplary embodiment, the device 100 receives an image-obtaining input of selecting a part or a whole area of a screen of the device 100.

For example, the device 100 may receive an image-obtaining input of selecting a part of an area of a screen of the device 100 via a touch input by a user.

As another example, the device 100 may receive an image-obtaining input of selecting a part of an area of a screen of the device 100 via a drag input to the screen by the user.

The user input described with reference to FIG. 1 may include an image-obtaining input.

In operation S520, according to an exemplary embodiment, the device 100 obtains an image in the selected area, which is determined based on the image-obtaining input received in operation S510.

For example, the device 100 may obtain an image in a rectangular area having a coordinate from which a touch input by the user starts and a coordinate at which the touch input by the user ends as both ends of a diagonal line of the rectangular area.

As another example, the device 100 may obtain an image in a closed curve area obtained via a drag input by the user.

Alternately, a method of obtaining an image in a selected area of a screen via a user input may be employed.

In operation S530, according to an exemplary embodiment, the device 100 determines an application using the obtained image, from among one or more applications, and displays the determined application.

For example, the device 100 may display a phone call application determined based on a user input, from among a plurality of applications. The phone call application may be an application using the image obtained in operation S520. For example, the image obtained in operation S520 may be used as an avatar image representing one of the contact information items displayed in the phone call application.

In operation S540, according to an exemplary embodiment, the device 100 determines whether the image, obtained in operation S520, is covered by an area on which the application determined in operation S530 is displayed.

According to an exemplary embodiment, the device 100 may determine whether an area, covered when the image obtained in operation S520 is displayed on the screen, is present. For example, if a partial area of the image in the selected area, obtained in operation S520, is covered by the application determined in operation S530, the partial area of the image in the selected area, obtained in operation S520, may not be displayed. The device 100 may determine whether the obtained image in the selected area is covered by the application.

In operation S550, according to an exemplary embodiment, if the obtained image is covered by the area on which the determined application is displayed, the device 100 displays the image, obtained in operation S520, on the area on which the determined application is displayed to overlap with the area on which the determined application is displayed.

According to an exemplary embodiment, if the device 100 determines, in operation S540, that the image obtained in operation S520 is covered by the area on which the determined application is displayed, the device 100 displays the image, obtained in operation S520, on the area on which the determined application is displayed, to overlap with the area on which the determined application is displayed. The image obtained in operation S520 may be displayed on an area in which the image obtained in operation S520 overlaps with the area on which the determined application is displayed.

Figure 6:
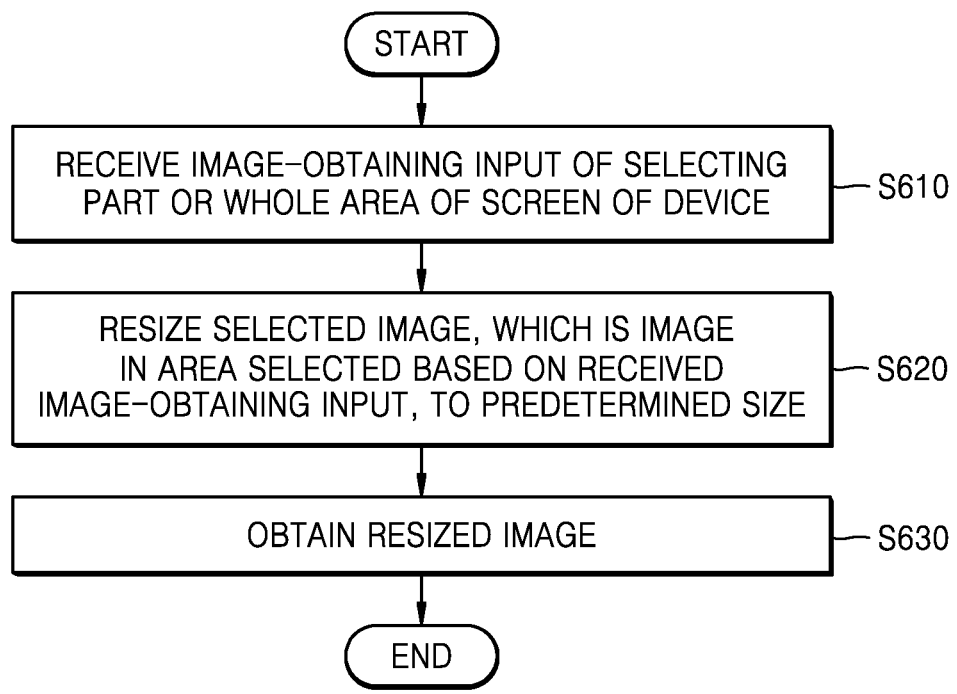
FIG. 6 is a flowchart of a method of resizing an image in a selected area and displaying the image according to an exemplary embodiment.

FIG. 6 is a flowchart of a method of resizing an image in a selected area and displaying the image according to an exemplary embodiment.

In operation S610, according to an exemplary embodiment, the device 100 receives an image-obtaining input of selecting a part or a whole area of a screen of the device 100.

For example, the device 100 may receive an input of selecting a certain area of a screen of the device 100, and obtain an image displayed on the selected area based on the received selecting input. According to an exemplary embodiment, the device 100 may receive the image-obtaining input of selecting a part of an area of the screen of the device 100 via a touch input by a user.

As another example, according to an exemplary embodiment, the device 100 may receive an image-obtaining input of selecting a part of an area of a screen of the device 100 via a drag input to the screen by a user. According to an exemplary embodiment, the device 100 may obtain an image in a rectangular area having a coordinate from which a touch input by the user starts and a coordinate at which the touch input by the user ends as both ends of a diagonal line of the rectangular area. According to another exemplary embodiment, the device 100 may obtain an image in a closed curve area obtained via a drag input by the user.

In operation S620, according to an exemplary embodiment, the device 100 resizes a selected image that is an image in the selected area to have a predetermined size, based on the image-obtaining input received in operation S610.

According to an exemplary embodiment, the device 100 may resize the selected image that is the image obtained in operation S610 to have a predetermined size. For example, the device 100 may reset a size of the selected image, obtained in operation S610, to a size of 300×400 pixels.

In operation S630, according to an exemplary embodiment, the device 100 obtains the image resized in operation S620.

Figure 7:
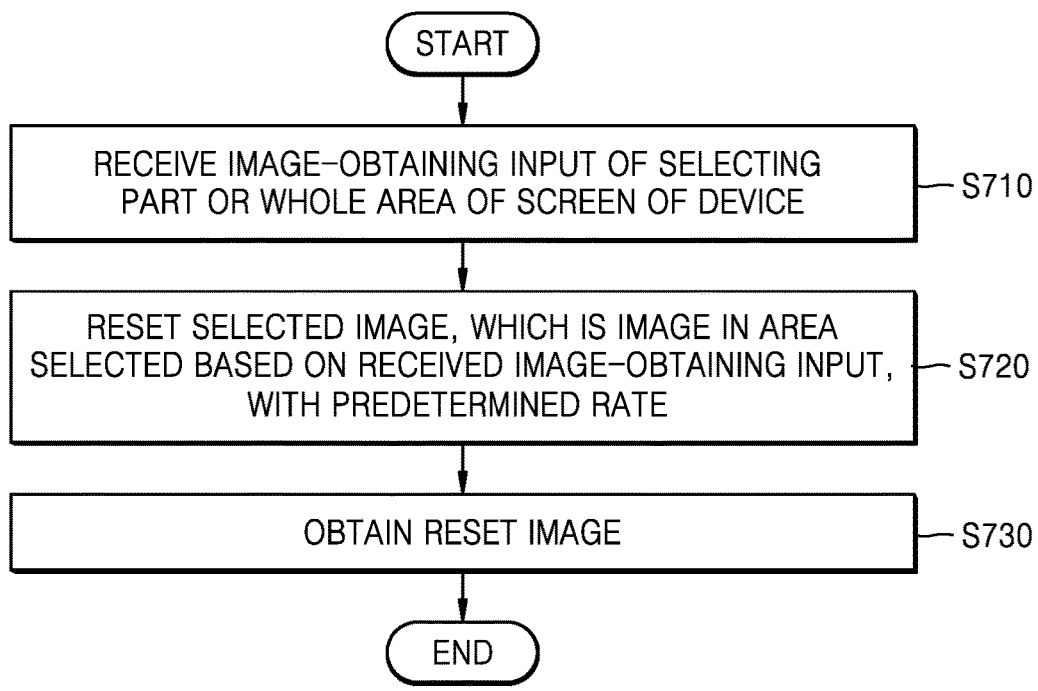
FIG. 7 is a flowchart of a method of displaying an image in a selected area with a reset ratio according to an exemplary embodiment.

FIG. 7 is a flowchart of a method of displaying an image in a selected area with a reset width-to-length ratio according to an exemplary embodiment.

In operation S710, according to an exemplary embodiment, the device 100 receives an image-obtaining input of selecting a part or a whole area of a screen of the device 100.

For example, the device 100 may receive an input of selecting a certain area of a screen of the device 100, and obtain an image displayed on the selected area based on the received selecting input. According to an exemplary embodiment, the device 100 may receive an image-obtaining input of selecting a part of an area of the screen of the device 100 via a touch input by a user.

As another example, according to an exemplary embodiment, the device 100 may receive an image-obtaining input of selecting a part of an area of a screen of the device 100 via a drag input to the screen by a user. According to an exemplary embodiment, the device 100 may obtain an image in a rectangular area having a coordinate from which a touch input by the user starts and a coordinate at which the touch input by the user ends as both ends of a diagonal line of the rectangular area. Alternately, according to another exemplary embodiment, the device 100 may obtain an image in a closed curve area obtained via a drag input by a user.

In operation S720, according to an exemplary embodiment, the device 100 resets a selected image, which is an image in the area selected based on the image-obtaining input received in operation S710, with a predetermined width-to-length ratio.

According to an exemplary embodiment, the device 100 may reset a ratio between a width and a length of the selected image that is an image in the selected area, based on the image-obtaining input received in operation S710. For example, the device 100 may reset a ratio between a width and a length of the selected image at 3:4.

In operation S730, according to an exemplary embodiment, the device 100 obtains the image reset in operation S720.

Figure 8:
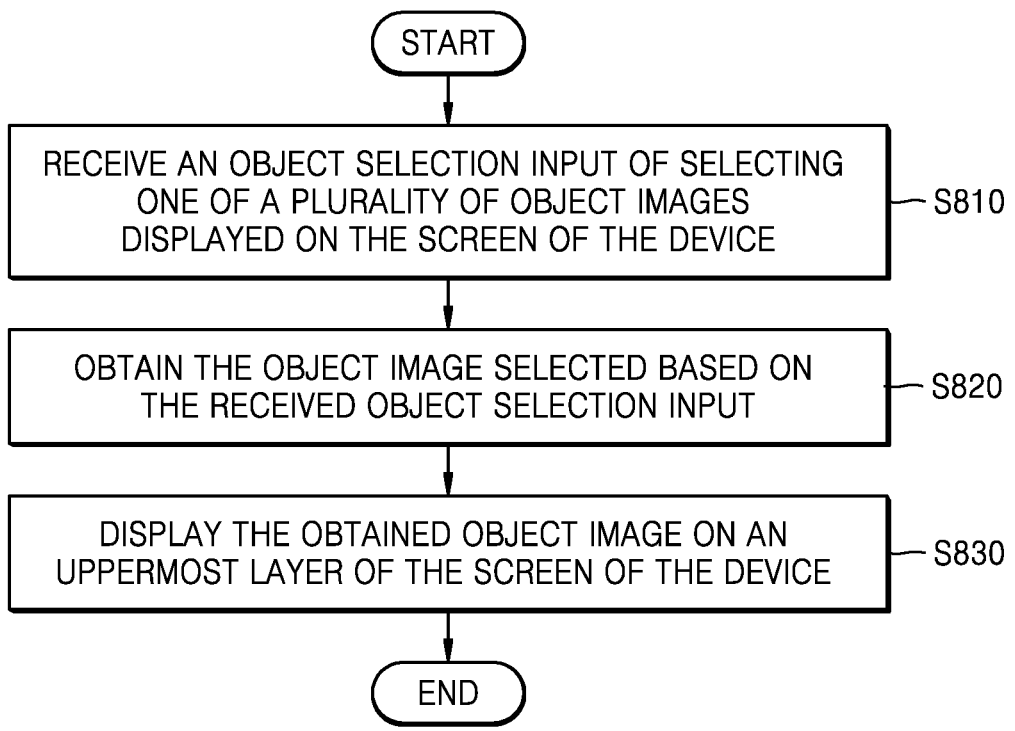
FIG. 8 is a flowchart of a method of obtaining an image and displaying the obtained image on an uppermost layer of a screen of the device according to an exemplary embodiment.

FIG. 8 is a flowchart of a method of obtaining an image and displaying the obtained image on an uppermost layer of a screen of the device 100 according to an exemplary embodiment.

In operation S810, according to an exemplary embodiment, the device 100 receives an object selection input of selecting one of a plurality of object images displayed on the screen of the device 100.

For example, the device 100 may receive an object selection input of selecting a first object from among the first object, a second object, and a third object, which are displayed on the screen of the device 100. According to an exemplary embodiment, the device 100 may determine the display image as one or more objects based on a constitution, a color, or a shape of the displayed image. For example, as described with reference to FIG. 14A, the device 100 may determine a selected object 1410, which is an image having a different color from a background color around the object 1410, as an object.

In operation S820, according to an exemplary embodiment, the device 100 obtains the object image selected based on the received object selection input.

For example, according to an exemplary embodiment, the device 100 may obtain a rectangular image that includes the selected object image.

In operation S830, according to an exemplary embodiment, the device 100 displays the obtained object image on an uppermost layer of the screen of the device 100.

For example, the obtained object image is displayed on the uppermost layer of the screen from among layers of the screen, and thus, may be displayed without being covered by another application.

Figure 9:
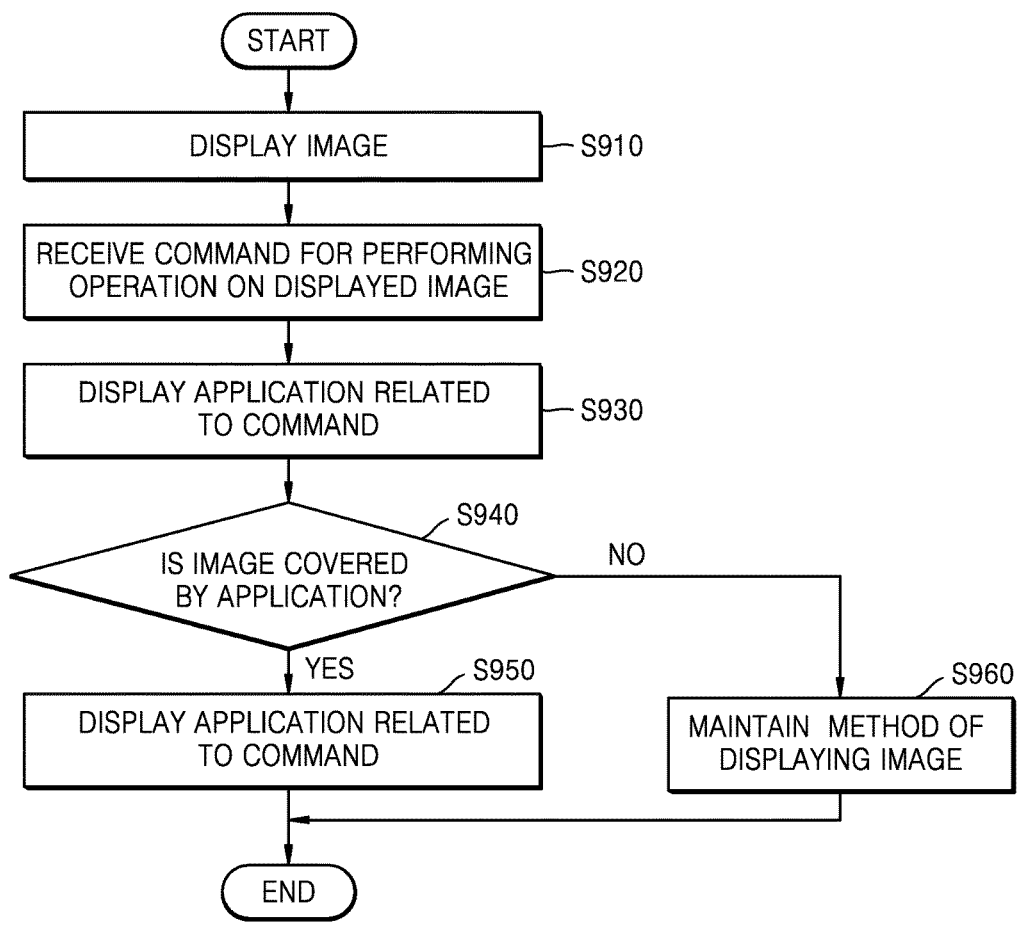
FIG. 9 is a flowchart of a method of determining a method of displaying an obtained image according to an exemplary embodiment.

FIG. 9 is a flowchart of a method of determining a method of displaying an obtained image according to an exemplary embodiment.

In operation S910, according to an exemplary embodiment, the device 100 displays an image.

For example, the device 100 may obtain an image and display the obtained image in a floating state. Displaying an image in a floating state may refer to displaying the image on an uppermost layer of a screen. A location where the image is displayed may be changed. For example, a location of a floating image may be moved by dragging the floating image.

Additionally, obtaining of an image may be performed before operation S910 is performed. According to an exemplary embodiment, an image may be selected from a displayed image list to obtain an image. According to another exemplary embodiment, an image may be obtained by grabbing the image from a screen. According to an exemplary embodiment, grabbing may refer to an operation, a method, or an input of obtaining an image by using a predetermined method.

One or more images may be obtained from one or more images displayed in operation S910.

According to an exemplary embodiment, a grabbed image may be obtained by dragging an image displayed on a certain area of the screen. The grabbed image may be displayed in a floating state. For example, if a plurality of images are grabbed, after the plurality of images are all grabbed, the grabbed plurality of images may be displayed in a floating state.

In operation S920, according to an exemplary embodiment, the device 100 may receive a command for performing an operation on the image displayed in operation S910.

In operation S930, according to an exemplary embodiment, the device 100 may display an application related to the command. For example, the device 100 may display a phone call application based on a touch input by a user.

In operation S940, according to an exemplary embodiment, the device 100 may determine whether the image is covered by the application displayed in operation S930.

In operation S950, according to an exemplary embodiment, the device 100 may display an application related to the command if it is determined that the image is covered by the application in operation S940. The device 100 may display the image in a floating state.

In operation S960, according to an exemplary embodiment, the device 100 may maintain displaying the image if it is determined that the image is not covered by the application in operation 940.

Figure 10:
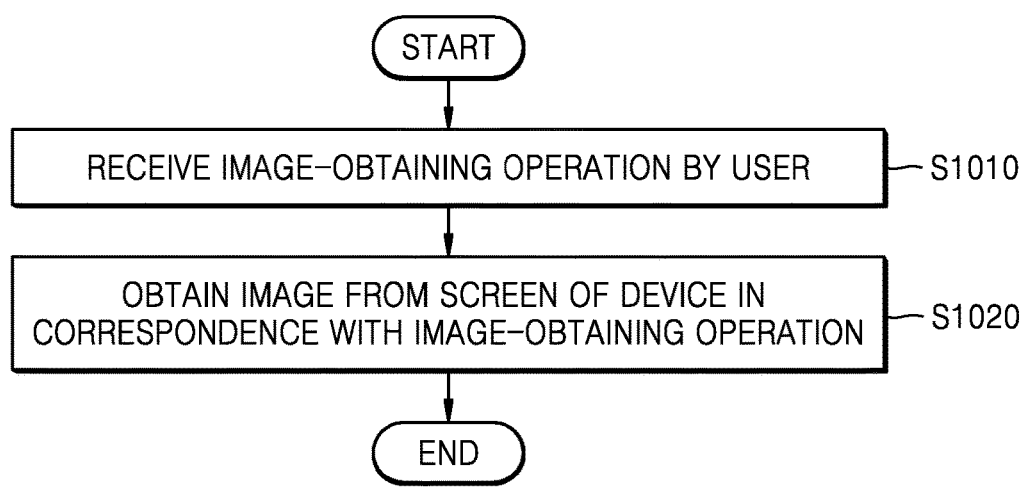
FIG. 10 is a flowchart of a method of obtaining an image according to an exemplary embodiment.

FIG. 10 is a flowchart of a method of obtaining an image according to an exemplary embodiment.

As shown in FIG. 10, a user's operation of grabbing an image is received in operation S1010. According to an exemplary embodiment, the device 100 may grab an image from one or more applications according to the operation of grabbing an image.

In operation S1020, the image is grabbed from a screen of the device 100 in correspondence with the operation of grabbing the image. The image grabbed in operation S1020 may be displayed. According to an exemplary embodiment, if an operation of grabbing a plurality of images by a user is received, the device 100 may display a screen for selecting whether image grabbing is to be further performed while the grabbed image is displayed, receive an input of selecting whether the image grabbing is to be further performed, and perform operations S1010 and S1020 in correspondence with an operation according to the received input.

FIG. 11 is a flowchart of a method of establishing an association between an obtained image and an object displayed on an application, and performing an operation on the obtained image based on the established association according to an exemplary embodiment.

Operations S1110 through S1160 correspond to operations S910 through S960. Thus, detailed descriptions thereof will not be provided here.

In operation S1170, a predetermined user input of establishing an association between an image displayed on an uppermost layer of a screen of the device 100 and an object displayed on an application related to a command for performing an operation on the displayed image. Here, one or more objects are displayed on the application.

A predetermined user input of establishing an association between an image and object may be received to establish an association between an image displayed on an uppermost layer of a screen and an object displayed on an application. A predetermined user input of establishing an association between each of a plurality of images displayed on the uppermost layer of the screen and one of a plurality of objects displayed on an application may be received to establish an association between the plurality of images and the plurality of objects. For example, an association between a first image and a first contact information item included in a phone call application may be established. According to an exemplary embodiment, the device 100 may use the first image as an avatar image representing first contact information.

According to an exemplary embodiment, an object displayed on an application may include an identification, an option, a graph, and a word. For example, an identification displayed on an application may include a file folder identification or a contact identification. According to an exemplary embodiment, the file folder identification may represent a folder. According to an exemplary embodiment, the contact identification may represent an image shown in a process of establishing an association. For example, the contact identification may include a contact information item. An option displayed on an interface may be an option for generating a new contact. A predetermined user input of establishing an association between an image and the file folder identification, the contact identification, or the option for generating a new contact may be received in operation S1170. According to an exemplary embodiment, a contact may refer to establishment of an association between two subjects.

According to an exemplary embodiment, a predetermined input may be a drag input. Particularly, a drag input may include dragging of an image to an area of an application on which an object is displayed, or dragging of an object displayed on an application to an area in which an image is present to establish an association between the image and the object.

For example, an image may be dragged to an area in which the file folder identification, the contact identification, or the option for generating a new contact is present. Alternately, the file folder identification, the contact identification, or the option for generating a new contact may be dragged to an area in which the image is present. For example, if the file folder identification is dragged to an area in which a second image is present, an association between the file folder identification and the second image may be established. According to an exemplary embodiment, the device 100 may move or copy the second image to a file folder. According to another exemplary embodiment, the device 100 may use the second image as an image representing the file folder identification.

For example, according to an exemplary embodiment, if an input of dragging a third image to an area of an application in which a first object is present or an input of dragging the first object to an area in which a third image is present is received, the device 100 may establish an association between the third image displayed on an uppermost layer of a screen and the first object displayed on the application.

As another example, if an input of dragging a first object to an area in which a third image is present or an input of dragging the third image to an area in which the first object is present is received, the device 100 may establish an association between the third image displayed on an uppermost layer of the screen and the first object displayed on the application.

According to an exemplary embodiment, the device 100 may simultaneously or respectively establish associations between a plurality of images and a plurality of objects. After an operation of selecting a plurality of objects by the user is received, if the selected plurality of images are simultaneously dragged to a predetermined area, if the selected plurality of images are dragged to a predetermined area, or if a predetermined input (e.g., a click on a predetermined button) is received, a plurality of associations may be established.

According to another exemplary embodiment, a predetermined input may be a click input or a long-click input. A click input may include a touch input to a touchscreen. A click input or a long-click input may include a click input or a long-click input to an object displayed on an application or a click input or a long-click input to an image. For example, if an image is displayed on an uppermost layer of a screen of the device 100, an association between the image and an object may be established by performing a click or a long click on the object. If an object is present on an application, an association between the image and the object may be established by performing a click or a long click on the image.

In operation S1180, an association between the image and the object may be established in correspondence with the predetermined input.

For example, if the predetermined input is a drag input, an association between the object displayed on the application and the image may be established in correspondence with a drag input. If the predetermined input is a click input or a long-click input, an association between the image displayed on the application and the object may be established in correspondence with the click input, the long-click input, or the drag input.

In operation S1190, according to an exemplary embodiment, the device 100 may perform an operation on the image, based on the association established in operation S1180.

After the image is established in association with the object displayed on the application, the command performed on the displayed image, which is described with reference to operation S920 shown in FIG. 9, may be performed to apply the image to the object displayed on the application.

For example, if the displayed object is the file folder identification on the application, after the image is established in association with the file folder identification, the image may be moved or copied to a file folder corresponding to the file folder identification. If the object displayed on the application is a contact identification, after an association between the image and the contact identification is established, the image may be set as a contact avatar corresponding to the contact identification. According to an exemplary embodiment, the contact avatar may include an avatar image described above. If an object displayed on the application is an option for generating a new contact identification, after an association between the image and the new contact identification is established, the image may be set as an avatar of the new contact identification.

Additionally, the operations described above may be performed on a plurality of images or a plurality of objects.

FIG. 12 is a flowchart of a method of establishing an association between an obtained image and an object displayed on an application and setting the image as a contact avatar based on the established association according to an exemplary embodiment.

In operation S1210, an image is displayed.

Obtaining of the image may be performed before operation S1210 is performed. According to an exemplary embodiment, the image may be obtained from a displayed image list. According to another exemplary embodiment, an image may be obtained by grabbing the image from a screen.

Here, one or more images may be obtained and one or more images may be displayed in operation S1210.

In operation S1220, a command for setting an image that is to be used as a contact avatar is received. For example, an option for setting a contact avatar may be displayed on a screen of the device 100. Additionally, the command for configuring the image to be contact avatar is received by receiving the user's selection operation for the option.

According to an exemplary embodiment, the user's selection operation for the option may be a click operation, a slide operation and a long-click operation, etc. For example, an action of clicking the "Contact" icon by the user may be the command for configuring the image to be a contact avatar.

In operation S1230, an application for setting a contact avatar is displayed. According to an exemplary embodiment, an application may include at least one selected from the group consisting of an application for a contact entry list, an application for a contact group entry list, and an application for single contact information.

In operation S1240, it is determined whether an image is covered by the application for setting a contact avatar.

If the image is covered by the application for setting the contact avatar, a method of displaying an image may be maintained in operation S1260. The image may be displayed by using the method performed in operation S1210.

If the image is covered by the application for setting the contact avatar, operation S1250 may be performed. An image may be displayed on an uppermost layer of a screen of the device 100.

In operation S1250, the device 100 may display the image on the uppermost layer of the screen to have a predetermined size or with a predetermined proportion with respect to the image itself or the screen.

Here, according to an exemplary embodiment, in operation S1250, the displayed image may be displayed in a floating state. As the image is displayed on the uppermost layer, contact information may be viewed in the application for setting the contact avatar. Alternately, as the image is displayed on the uppermost layer, another operation may be performed by using the image on the application. However, exemplary embodiments are not limited thereto, and the image may be displayed on a predetermined location in the uppermost layer of the screen of the device 100.

In operation S1270, a predetermined user input of establishing an association between the image displayed on the application and the object is received.

A predetermined user input of establishing an association between an image displayed on the uppermost layer of the screen and an object displayed on the application may be received, to establish an association therebetween. A predetermined user input of establishing an association between each of a plurality of images displayed on the uppermost layer of the screen and one of a plurality of objects displayed on an application may be received to establish an association between the plurality of images and the plurality of objects.

According to an exemplary embodiment, an object displayed on an application may be an indication of a contact identification. For example, the contact identification may include at least one selected from the group consisting of a contact entry, a contact avatar, and a contact group entry. A predetermined user input of setting an association between the image and the contact identification may be received in operation S1270.

According to an exemplary embodiment, the device 100 may simultaneously or respectively establish associations between a plurality of images and a plurality of objects. After an operation of selecting a plurality of objects by the user is received, if the selected plurality of images are simultaneously dragged to a predetermined area, if the selected plurality of images are dragged to a predetermined area, or a predetermined input (e.g., a click on a predetermined button) is received, a plurality of associations may be established.

According to another exemplary embodiment, a predetermined input may be a click input or a long-click input. A click input may include a touch input to a touchscreen. A click input or a long-click input may include a click input or a long-click input to an object displayed on an application or a click input or a long-click input to an image. For example, if an image is displayed on an uppermost layer of the screen of the device 100, an association between the image and an object may be established by performing a click or a long click on the object. If an object is present on an application, an association between an image and the object may be established by performing a click or a long click on the image.

If a contact identification is present on the application, an association between an image and the contact identification may be set by performing a click or a long click on the image.

According to another exemplary embodiment, an object displayed on the application may be an option for generating a new contact. A predetermined user input of establishing an association between the image and the option for generating a new contact may be received in operation S1270.

For example, the predetermined input of establishing an association between the image and the option for generating a new contact may be, for example, a drag input. A drag input may include at least one selected from the group consisting of dragging of an image to an area in which the option for generating a new contact is present, or dragging of the option for generating a new contact to an area in which the image is present. According to another exemplary embodiment, a predetermined input may include a click input or a long-click input. A click input or a long-click input may include a click input or a long-click input to the option for generating a new contact or a click input or a long-click input to the image.

In operation S1280, an association between the image and the object may be established in correspondence with the predetermined input.

For example, in a case in which the predetermined input is a drag input, an association between the image and the object displayed on the application, which are dragged together, may be established in correspondence with the drag input. In a case in which the predetermined input is a click input or a long-click input, an association between the image and the object displayed on the application may be established in correspondence with the click input or a long-click input.

For example, each association between respective images and one of a plurality of objects may be established in correspondence with the predetermined input of establishing an association between a plurality of images and a plurality of objects.

In operation S1290, the image may be set as a contact avatar in correspondence with the object of which an association with the image is established.

After an association between the image and a contact identification displayed on the application is established, the image may be set as a contact avatar corresponding to the contact identification of which an association with the image is established.

After an association between the image and the option for generating a new contact is established, the image may be set as a blank contact avatar. According to an exemplary embodiment, a blank contact avatar may refer to a contact avatar for which the contact avatar is not determined. An application for setting a new contact entry may be displayed. The image may be used as a blank contact avatar.

If an image is set as a contact avatar, the image may be adjusted based on set information about the contact, and the adjusted image may be set as the contact avatar. The set information about the contact avatar may include a predetermined form or a preset shape of a contact avatar.

The step of adjusting the image based on the predetermined form or preset shape of the contact avatar and the setting or configuring the adjusted image to be the contact avatar may include comparing the predetermined form or preset shape of the image with the predetermined form or the preset shape of the preset shape of the contact avatar; filling a background filling color that is identical to or similar to a background color of the image around the image such that the form or the shape of the filled image is consistent with the form or the preset shape of contact avatar, when the form or the shape of the image is different from the form or the preset shape of contact avatar; configuring the filled image to be the avatar of the contact; and the image is configured to be the avatar of the contact when the form or the shape of the image is identical with the preset shape of contact avatar.

FIG. 13 is a flowchart of a method of obtaining an image from a plurality of windows and displaying the obtained image according to an exemplary embodiment.

In operation S1310, according to an exemplary embodiment, the device 100 displays at least two windows on a screen.

According to an exemplary embodiment, the device 100 may display at least two windows in parallel with each other or to overlap each other.

In operation S1320, according to an exemplary embodiment, the device 100 receives a user input of grabbing an image from one or more of the at least two windows. According to an exemplary embodiment, the grabbing of an image may include obtaining an image. An application for applying the image may be displayed in other at least one window (i.e., a part or all of windows among other windows besides the window(s) from which the image is grabbed) among the at least two windows. Additionally, an application that is present in at least one window selected from the group consisting of the at least two windows from which the image is grabbed may be an application that may use the image.

In operation S1330, the grabbed image may be displayed on a screen in a floating state.

Alternately, the grabbed image may be displayed on a screen of the device 100 in a floating state, or displayed to have a predetermined size or with a predetermined proportion with respect to the image itself or width-to-length ratio in a floating state in a predetermined window from among the at least two windows on the screen of the device 100.

In operation S1320, one or more images may be grabbed from at least two windows. In operation S1330, the one or more grabbed images may be displayed on the screen. Additionally, in operation S1320, an operation of grabbing an image from the at least two windows (e.g., grabbing an image respectively from a plurality of windows; grabbing a plurality of images respectively from a plurality of windows; or grabbing an image from some of a plurality of windows and grabbing a plurality of images from others of the plurality of windows) may be received to grab an image from a plurality of windows from among the at least two windows.

According to another exemplary embodiment, an image may be obtained from a displayed window by performing an image grabbing operation by using a method applied to an image of the device 100, and the obtained image may be displayed on a screen of the device 100 in a floating state.

In operation S1340, a predetermined user input of establishing an association between the image displayed in a floating state and the object displayed on the at least one selected from the group consisting of the at least two windows is received.

One or more objects may be displayed on an application for applying the float-displayed image displayed on the at least one window. For example, the application may be an application or an interface for setting or configuring a contact avatar. For example, the at least one window may be at least one window among windows in which no image is grabbed among the at least two windows.

According to an exemplary embodiment, an object may include at least one selected from the group consisting of various objects displayed on an application, such as an identification, an option, a graph, and a word, etc.

According to an exemplary embodiment, an object on the application for setting a contact avatar may be a contact identification and/or an option for generating a new contact. The contact identification may include at least one item selected from the group consisting of a contact entry, a contact avatar, and a contact group entry. A predetermined user input of establishing an association between the image displayed in a floating state and the contact identification and/or the option for generating a new contact may be received in operation S1340.

A predetermined user input of respectively establishing an association between the image displayed in a floating state and objects displayed in separate windows of the application may be received when a plurality of windows on which applications that are to be applied to the image are displayed are present. For example, various applications for setting a contact avatar may be displayed on a plurality of windows. For example, various applications such as a phone call, WECHAT, MICROSOFT NETWORK (MSN), CREDULITY, and the like, may be displayed on separate windows. As such, contact avatars of various applications may be simultaneously set.

A predetermined user input of setting an association between the image displayed in a floating state and an object displayed on at least one selected from the group consisting of windows from which the image is grabbed may be received.

A predetermined input of establishing an association between each of a plurality of images displayed on a screen in a floating state and one of a plurality of objects displayed on at least one window may be received, to establish an association between the plurality of images and the plurality of objects. Here, the plurality of displayed objects may be located in a window or distributed to the plurality of windows.

According to an exemplary embodiment, a predetermined input may be a drag input. A drag input may be dragging of an image to an area in which an object is present, or dragging of a displayed object to an area in which an image is present.

For example, an image may be dragged to an area in which a file folder identification, a contact identification, or an option for generating a new contact is present. Alternately, a file folder identification, a contact identification, or an option for generating a new contact may be dragged to an area in which the image is present.

For example, a plurality of images may be displayed on a screen in a floating state. If a plurality of objects are displayed (the plurality of objects may be located in a window or distributed to the plurality of windows), or if an input of dragging each image to an area in which one of a plurality of objects is present or an input of dragging each object to an area in which one of the plurality of images is present is received, the device 100 may establish an association between the plurality of images and the plurality of objects.

Additionally, associations between the plurality of images and the plurality of objects may be simultaneously established or respectively established one-by-one (the plurality of objects may be displayed on a window or distributed to the plurality of windows). If an operation of selecting a plurality of objects by a user is received, a plurality of images are simultaneously selected and dragged to a predetermined area, a plurality of images are selected and dragged to a predetermined area, or an additional predetermined input (for example, an input of clicking on a predetermined button) is received, then an association between images and objects may be established according to a sequence of obtaining the plurality of images or a sequence of selecting the objects. For example, an association between an image and an object, which have a same sequence, may be established via a drag input.

To establish association between a plurality of images and a plurality of objects in each of the plurality of windows (for example, there are contact identifications corresponding to the plurality of images in all of the plurality of windows), a selection operation for the plurality of objects input by the user in respective windows is received. Then, the selected plurality of images may be simultaneously dragged to a predetermined area, the selected plurality of objects may be dragged to a predetermined area, or an additional predetermined input (e.g., an input of clicking on a predetermined button) may be performed. An association between images and objects in each window may be established according to a sequence of obtaining a plurality of images (e.g., selecting or grabbing a plurality of images) and a sequence of selecting an object in each window. For example, an association between an image and an object which have a same sequence may be established via the drag input.

According to another exemplary embodiment, a predetermined input may be a click input or a long-click input. A click input or a long-click input may be a click input or a long-click input to an object displayed on an application or a click input or a long-click input to an image. For example, if an image is displayed on a screen in a floating state, an association between the image and a contact identification may be established by performing a click or a long click on an object in one or more windows. In a case in which one object exists in different windows, an association between the image and the object may be established by performing a click or a long click on the image.

In operation S1350, an association between the image and the object may be established in correspondence with the predetermined input.

For example, in a case in which the predetermined input is a drag input, an association between the object and the image displayed on the application, which are dragged together, may be established in correspondence with the drag input. In a case in which the predetermined input is a click input or a long-click input, an association between the image and the displayed object may be established in correspondence with the click input or the long-click input.

In operation S1360, a predetermined operation may be performed on the image, based on the association.

An operation respectively corresponding to windows in which the object of which an association with the image is established is present may be performed. An amount of windows which the object has established association with the image may be one or more.

For example, with respect to an application for setting a contact avatar displayed on a window in which an object of which an association with the image is established is present, the image may be set as an avatar of which an association with an object (for example, a contact identification or an option for generating a new contact) is established. With an application for sharing an image displayed on a window in which the object of which an association with the image is established is present, the image may be transmitted to the object of which an association with the image is established.

The image may be obtained from at least two displayed windows by performing an image grabbing operation, and the obtained image may be displayed on a screen of the device 100 in a floating state. According to another exemplary embodiment, the image displayed on a screen of the device 100 in a floating state may be set as a contact avatar by using a method applied to an image in the device 100.

Figure 14A:
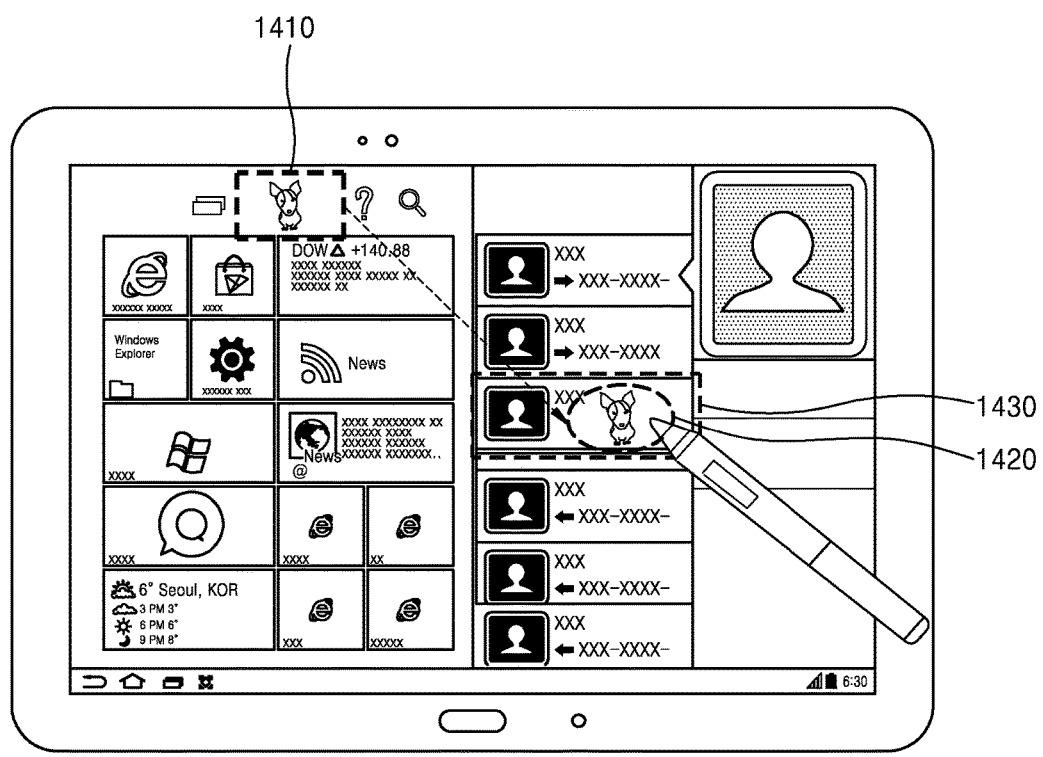
FIGS. 14A and 14B are diagrams illustrating an example of obtaining an image and displaying the obtained image according to an exemplary embodiment.
Figure 14B:
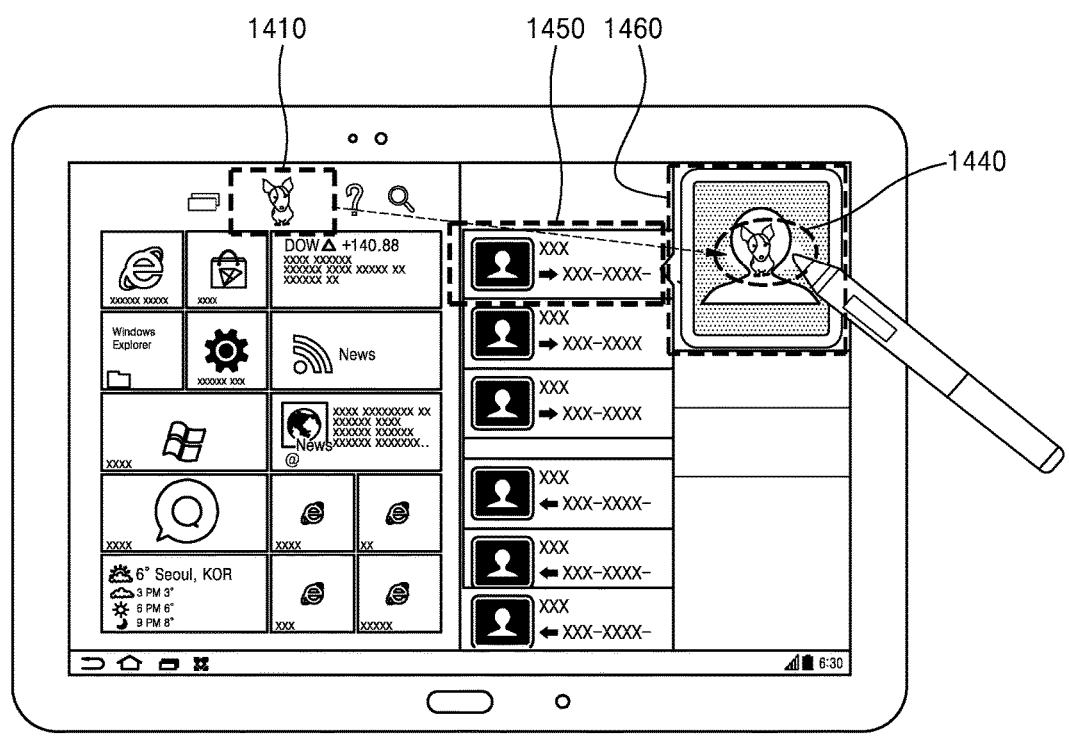

FIGS. 14A and 14B are diagrams illustrating an example of obtaining an image and displaying the obtained image according to an exemplary embodiment.

According to an exemplary embodiment, the device 100 may obtain an image displayed on an area of a screen based on a user input and move the obtained image based on a user input.

For example, the device 100 may obtain an image 1410 displayed on a certain area of the screen based on a first user input and display the obtained image 1410 on a first location 1420 based on a second user input. If a first contact information item 1430 is displayed to overlap with the first location 1420, the obtained image 1410 may be used as an avatar image representing the first contact information item 1430.

As another example, the device 100 may obtain the image 1410 displayed on a certain area of the screen based on a first user input and display the obtained image 1410 on a second location 1440 based on a third user input. If an unchanged avatar image 1460 of a second contact information item 1450 is displayed on the second location 1440 to overlap with the second location 1440, the obtained image 1410, instead of the unchanged avatar image 1460, may be used as a changed avatar image representing the second contact information item 1450.

As another example, the device 100 may obtain the image 1410 displayed on a certain area of the screen based on the first user input, edit the obtained image 1410, and then, display an edited image, obtained by editing the obtained image 1410, on the first location 1420 based on the second user input. If a first contact information item 1430 is displayed to overlap with the first location 1420, the edited image may be used as an avatar image representing the first contact information item 1430.

As another example, the device 100 may obtain the image 1410 displayed on an area of the screen based on the first user input, edit the obtained image 1410, and then, display an edited image, obtained by editing the obtained image 1410, on the second location 1440 based on the third user input. If the avatar image 1460 of the second contact information item 1450 is displayed to overlap with the second location 1440, the edited image, instead of the avatar image 1460, may be used as an avatar image representing the second contact information item 1450.

Figure 15A:
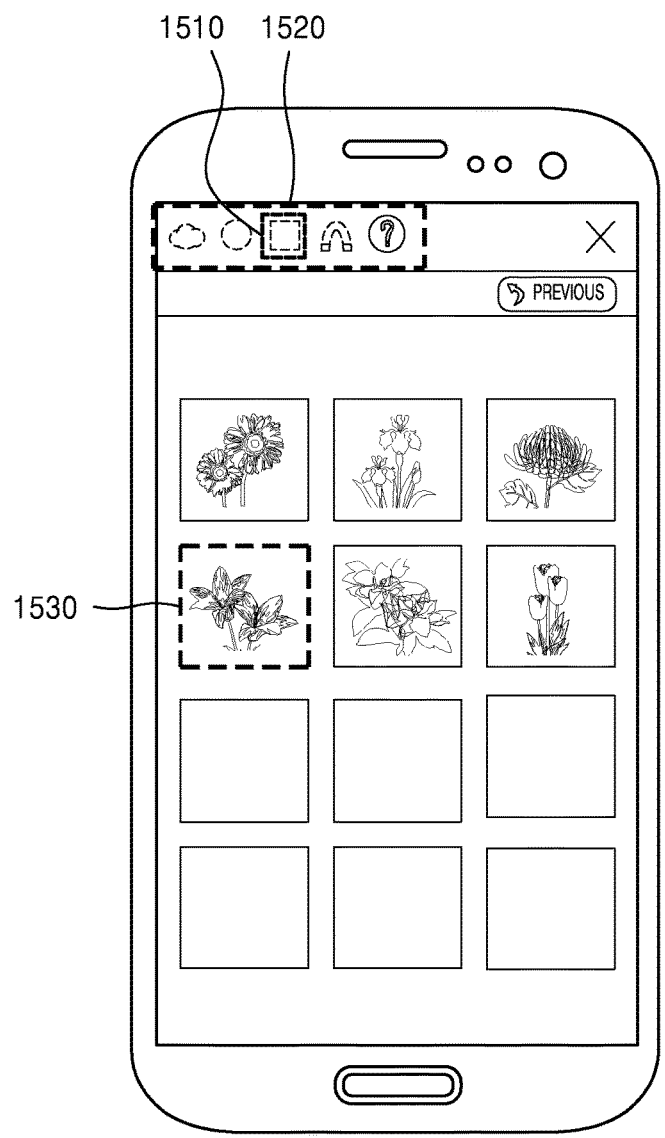
FIGS. 15A through 15C are diagrams illustrating an example of obtaining an image and displaying the obtained image on an uppermost layer of a screen of the device according to an exemplary embodiment.
Figure 15B:
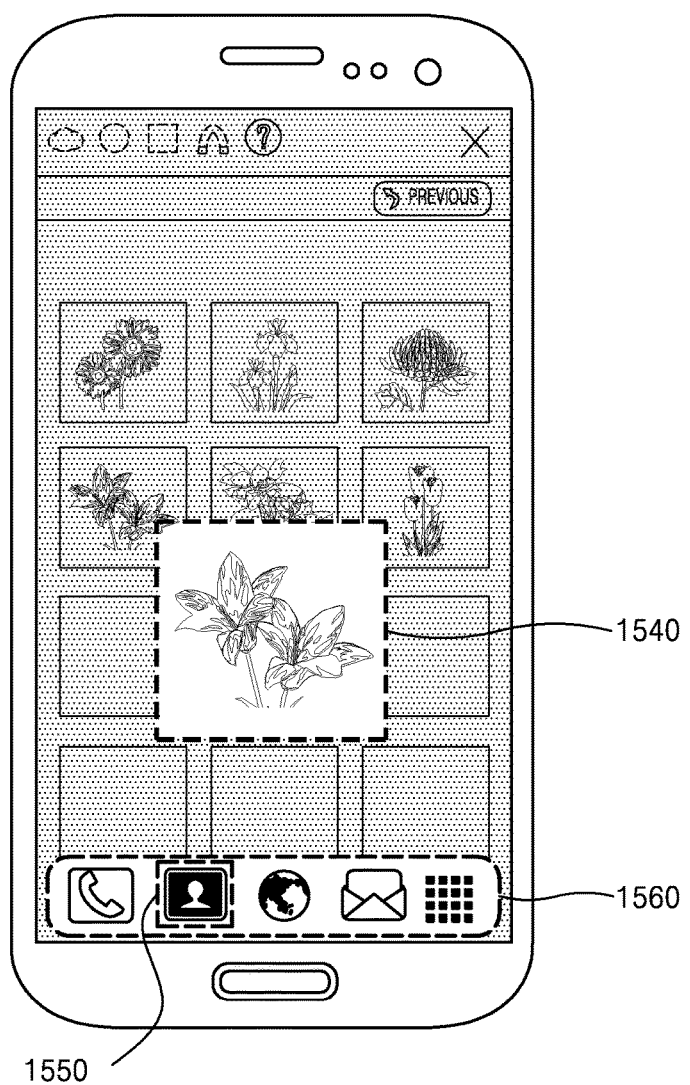
Figure 15C:
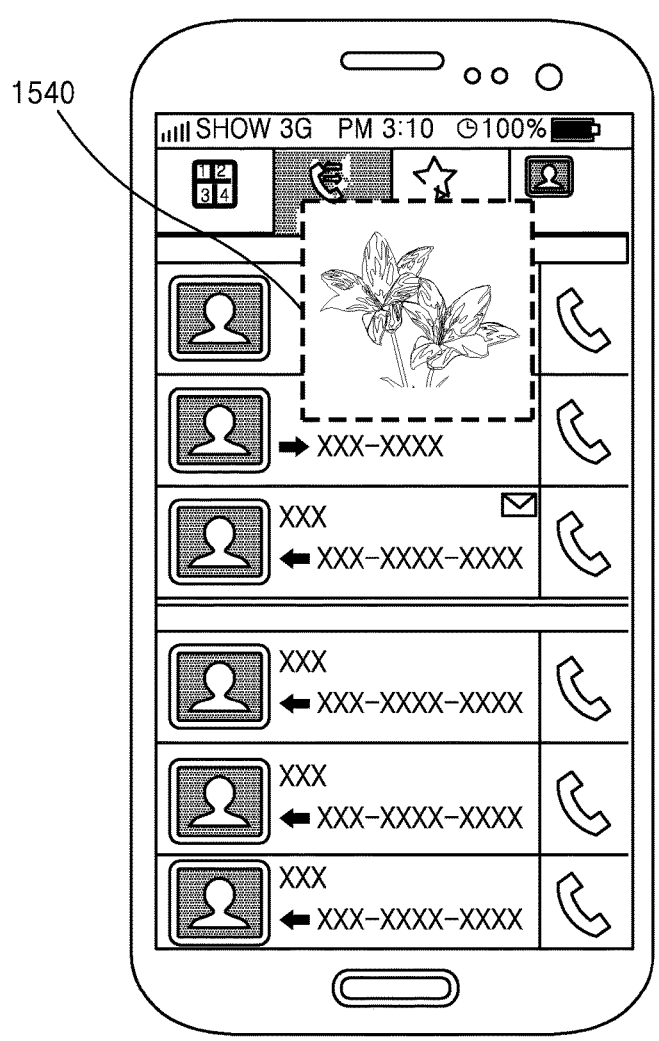

FIGS. 15A through 15C are diagrams illustrating an example of obtaining an image and displaying the obtained image on an uppermost layer of a screen of the device 100 according to an exemplary embodiment.

In an example shown in FIG. 15A, an image 1530 is obtained by grabbing the image from the screen. For example, the device 100 may select a certain area of the screen and obtain an image 1530 from the selected area.

For example, the device 100 may select the area of the screen by selecting a certain icon 1520 from among one or more icons displayed on a certain area 1510 of the screen, and thus, obtain an image 1530 of the selected area.

According to an exemplary embodiment, the device 100 may display the grabbed image 1530 on the screen of the device 100. For example, the device 100 may display the grabbed image 1530 on the screen of the device 100 in a floating state.

According to an exemplary embodiment, the device 100 may display a contact icon 1560 on a certain area of the screen. According to an exemplary embodiment, the contact icon 1560 may refer to an icon used when the device 100 communicates with an external device.

According to an exemplary embodiment, the device 100 obtains an image 1530 from a certain area as shown in FIG. 15A, and displays the obtained image 1530 or an image 1540 obtained by editing the obtained image 1530 in a floating state as shown in FIG. 15B. Additionally, according to an exemplary embodiment, the device 100 may receive an input of selecting a contact icon from among a plurality of contact icons 1550 when the obtained image 1530 or an edit image 1540 is displayed in a floating state. The device 100 may determine a contact method from among one or more contact methods according to the received selecting input. The device 100 may use the obtained image 1530 or the edited image 1540 as an avatar image representing a contact information item that is selected based on a user input, from among one or more contact information items included in the determined contact method.

After the device 100 receives the input of selecting the contact icon (e.g., a click input), an application for setting a contact avatar may be displayed on a screen of the device, and the grabbed image may be displayed on an uppermost layer of the screen as shown in FIG. 15C.

When the grabbed image is displayed on the uppermost layer of the screen of the device 100, an additional user input of ending an operation performed on the grabbed image may be performed.

For example, when the displayed image 1540 is processed, if a command with respect to the displayed image 1540 is a command for setting an image as a contact avatar, the device 100 may receive an additional selecting input of setting the displayed image 1540 as a contact avatar when the command with respect to the displayed image 1540 does not include information for setting the displayed image 1540 as a contact avatar, or the device 100 may set the displayed image 1540 as a contact avatar without having to receive an additional selecting input when the command with respect to the displayed image 1540 includes information for setting the displayed image 1540 as a contact avatar.

Figure 16A:
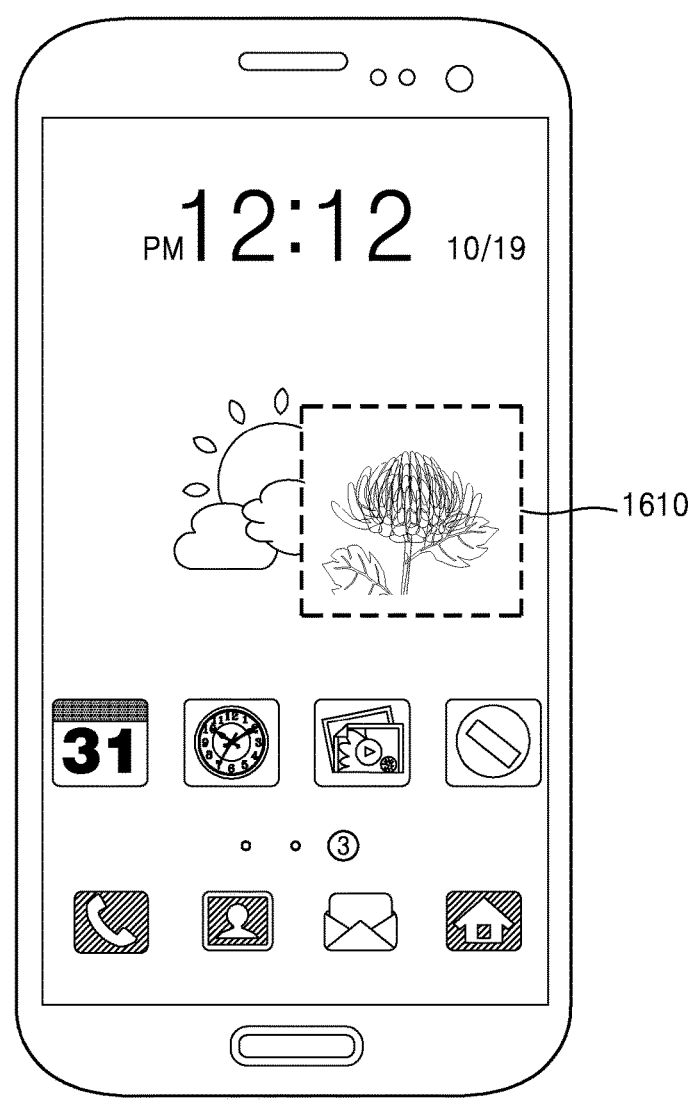
FIGS. 16A and 16B are diagrams illustrating an example of obtaining an image and performing an operation related to the obtained image according to an exemplary embodiment.
Figure 16B:
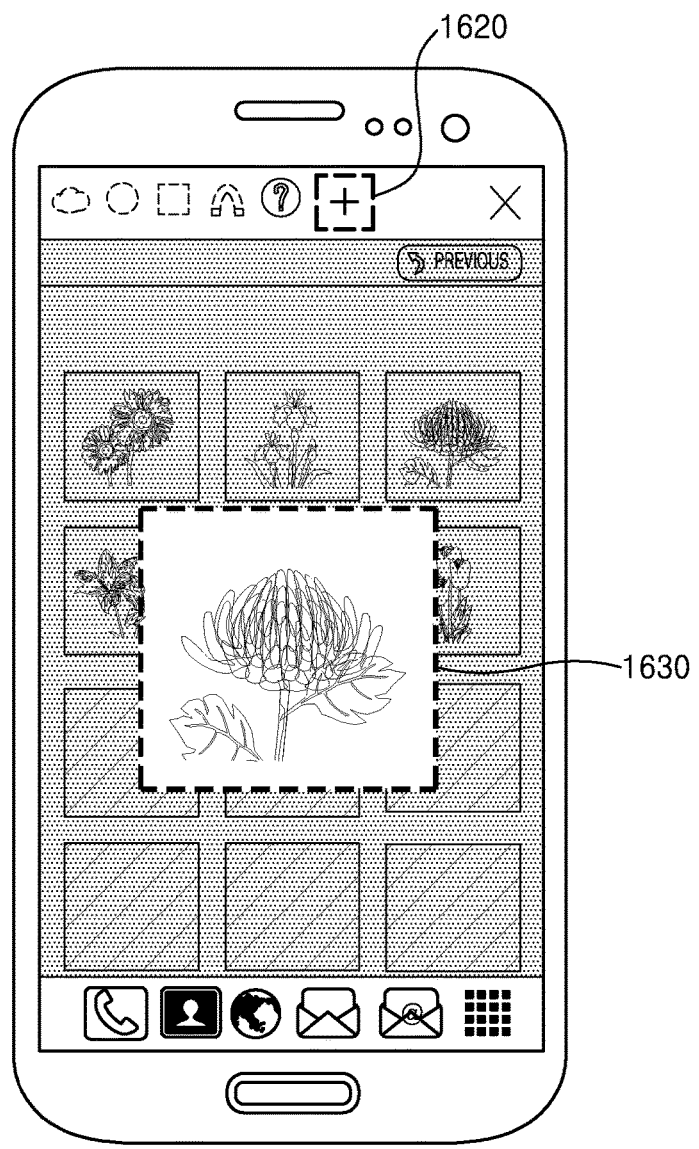

FIGS. 16A and 16B are diagrams showing an example of obtaining an image and performing an operation related to the obtained image according to an exemplary embodiment.

According to an exemplary embodiment, the device 100 may obtain an image displayed on a certain area 1610 of a screen displayed on the device 100. The device 100 may edit the obtained image and display the edited image 1630 in a floating state. Additionally, if an input of selecting a certain icon 1620 when the edited image 1630 is displayed in a floating state, the device 100 may obtain an additional image.

Figure 17A:
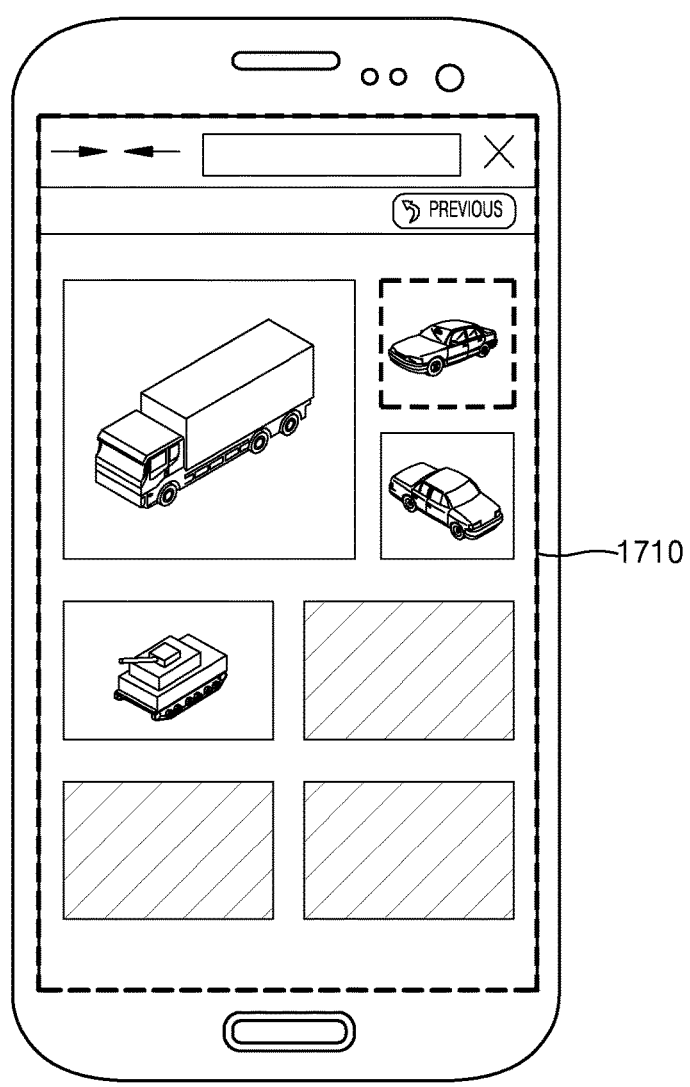
FIGS. 17A through 17C are diagrams illustrating an example of obtaining an image and displaying the obtained image on an application according to an exemplary embodiment.
Figure 17B:
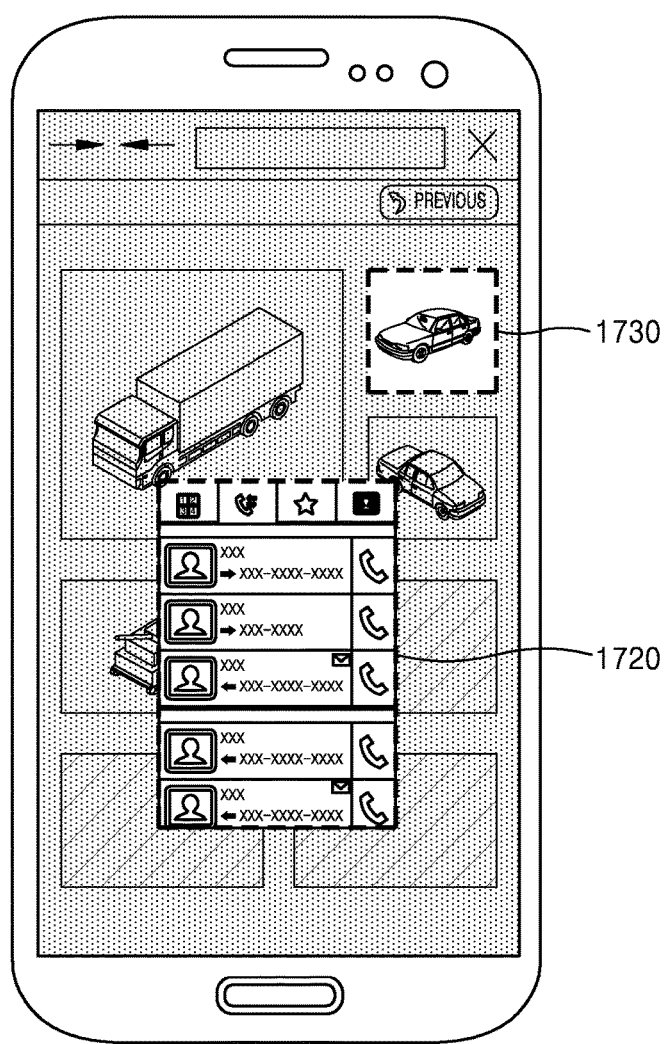
Figure 17C:
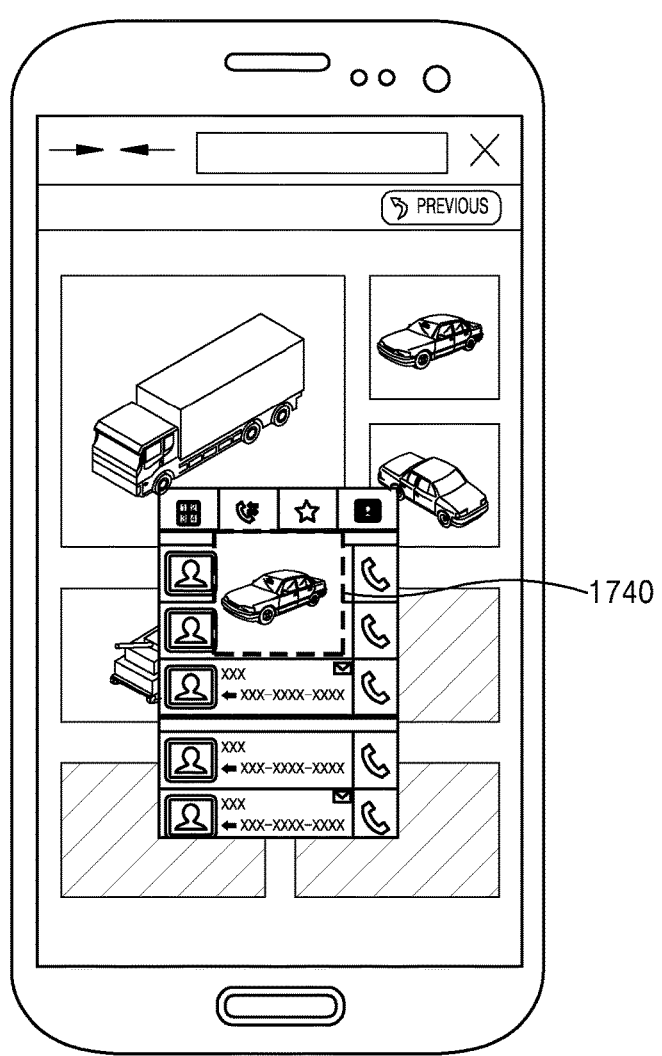

FIGS. 17A through 17C are diagrams showing an example of obtaining an image and displaying the obtained image on an application according to an exemplary embodiment.

According to an exemplary embodiment, the device 100 may set a certain image as a contact avatar when one or more windows are displayed.

According to an exemplary embodiment, the device 100 may display a first window 1710. Additionally, the device 100 may display a second window 1720 based on a user input. The first window 1710 and the second window 1720 may be displayed overlapping each other. Additionally, the device 100 may obtain an image 1730 displayed on the first window 1710 based on a user input. Additionally, the device 100 may edit the obtained image 1730 to have a predetermined size or with a predetermined width-to length ratio, and thus, obtain an edited image 1740. The edited image 1740 may be displayed in a floating state. A location of the edited image 1740 may be changed according to a user input. One contact information item from among contact information items displayed on the second window 1720 may be selected according to the changed location of the edited image 1740. The edited image 1740 may be used as an avatar image representing the selected contact information item.

As another example, one contact information item from contact information items displayed on the second window 1720 may be dragged to a location of the obtained image 1730 based on a user input. The obtained image 1730 may be used as an avatar image representing the dragged contact information item.

In the process described above, at least one input selected from the group consisting of a drag input, a short touch, a long touch, a short click, and a long click may be used as a selection input by a user.

Referring to FIG. 17B, one or more windows are displayed on a screen of the device 100 overlapping each other. For example, the first window 1710 displaying a webpage is displayed as a background screen, and the second window 1720 displaying a contact information item may be displayed overlapping a wallpaper of the screen. According to an exemplary embodiment, the device 100 obtains an image of a part of an area with respect to a whole image displayed on the first window 1710 displaying the web page, and display the obtained image 1730 in a floating state. Referring to FIG. 17C, it may be determined that the obtained image 1730 is displayed in a floating state. The obtained image 1730 may be moved based on a user input. For example, a location of the obtained image 1730 may be determined based on a drag input by a user. Additionally, an association between the obtained image 1730 and a certain contact information item may be established based on a location of the obtained image 1730. For example, an association between the obtained image 1730 and a contact information item overlapping with the obtained image 1730 may be established. As another example, an avatar image representing a contact information item overlapping with the obtained image 1730 may be substituted by the obtained image 1730.

Figure 18A:
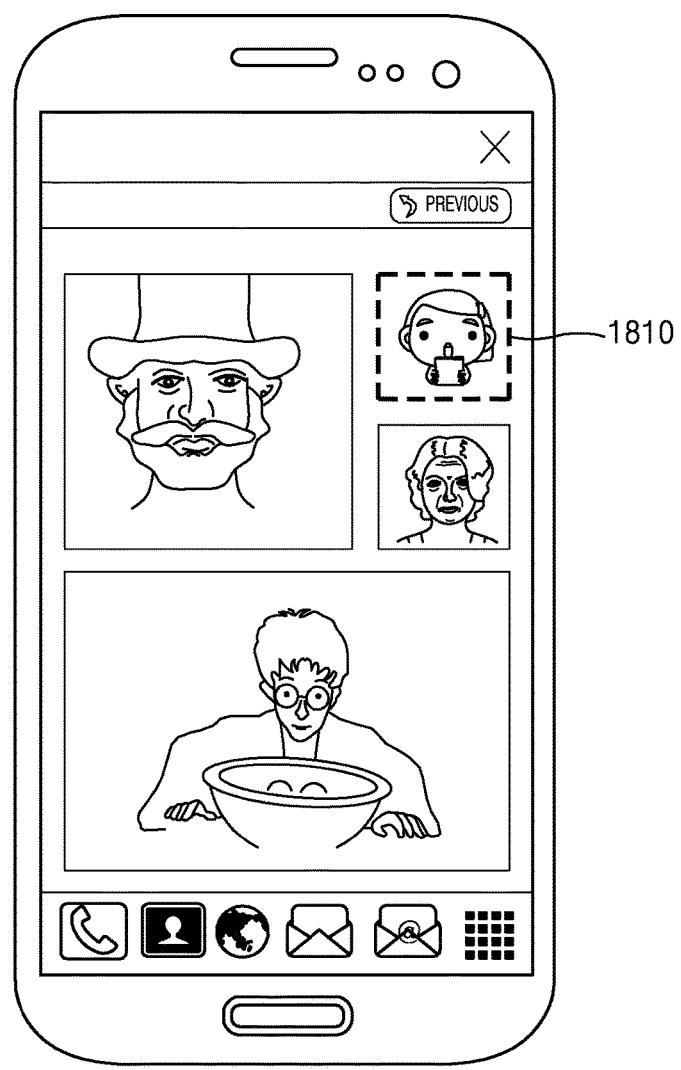
FIGS. 18A through 18C are diagrams illustrating an example of obtaining an image and displaying an application according to an additional input according to an exemplary embodiment.
Figure 18B:
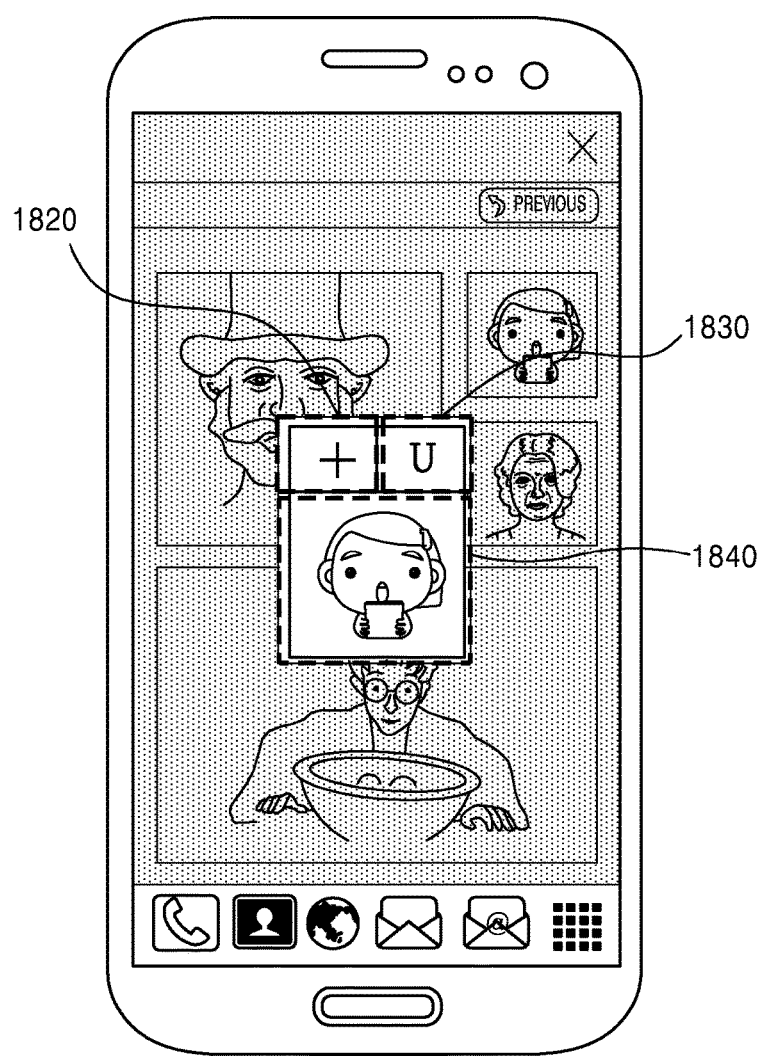
Figure 18C:
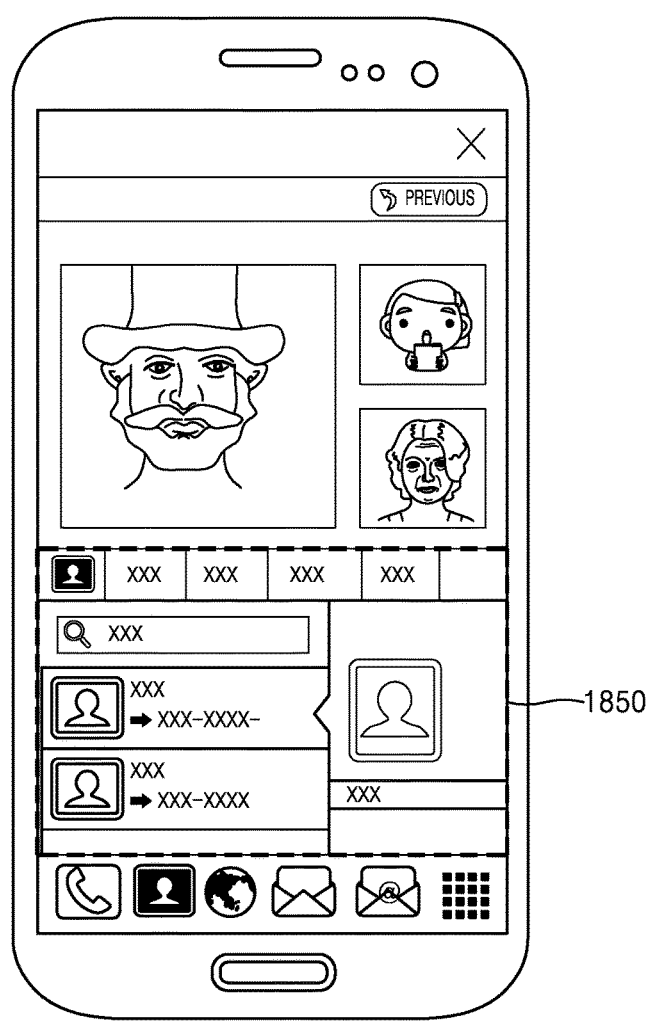

FIGS. 18A through 18C are diagrams showing an example of obtaining an image and displaying an application according to an additional input according to an exemplary embodiment.

According to an exemplary embodiment, the device 100 may obtain an image. For example, referring to FIG. 18A, the device 100 may obtain an image 1810 displayed on a certain area 1810 of a screen displayed on the device 100.

Referring to FIG. 18B, according to an exemplary embodiment, the device 100 may display an obtained image 1840, and first and second objects 1820 and 1830 representing menus related to a method of processing the obtained image 1840. For example, if the device 100 receives an input of selecting the first object 1820, the device 100 may perform an operation of obtaining an additional image. As another example, if the device 100 receives an input of selecting the second object 1830, the device 100 may perform an operation of updating a contact information list.

Referring to FIG. 18C, according to an exemplary embodiment, if the device 100 receives an input of selecting the second object 1830, the device 100 may display a window 1850 for updating contact information.

Figure 19A:
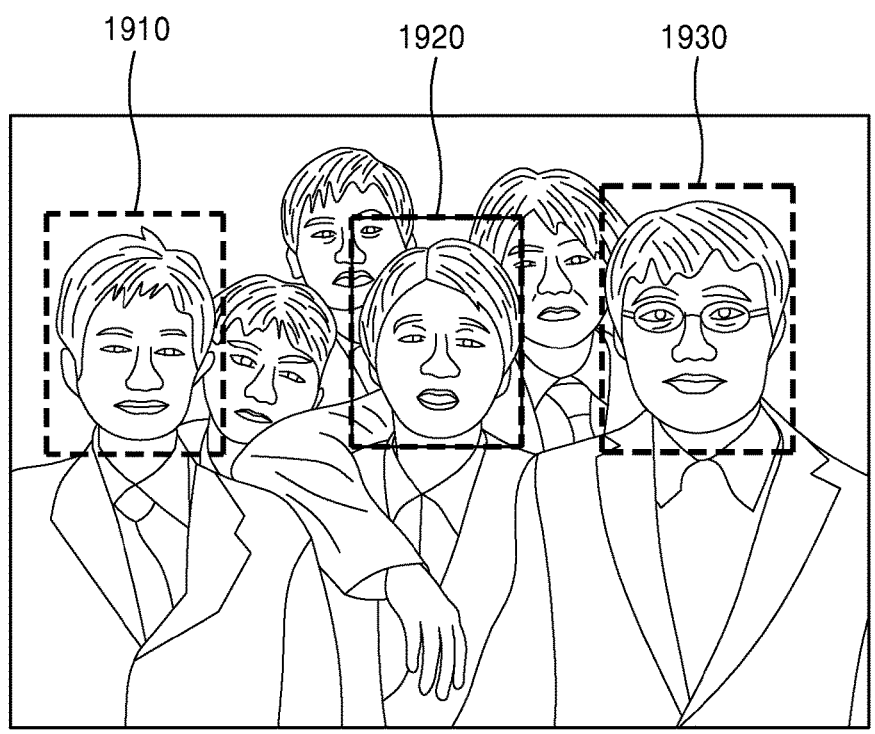
FIGS. 19A and 19B are diagrams illustrating an example of obtaining a plurality of images and using the obtained plurality of images according to an exemplary embodiment.
Figure 19B:
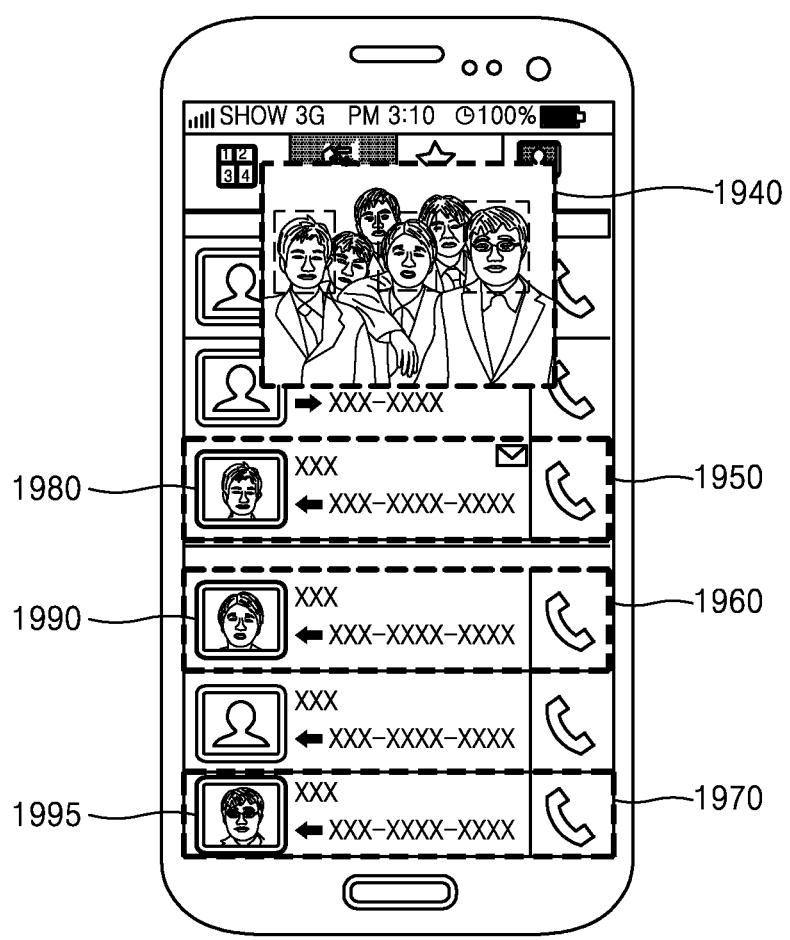

FIGS. 19A and 19B are diagrams showing an example of obtaining a plurality of images and using the obtained plurality of images according to an exemplary embodiment.

Referring to FIG. 19A, according to an exemplary embodiment, the device 100 may obtain a plurality of images from a plurality of areas of an image. For example, the device 100 may obtain a first image 1910, a second image 1920, and a third image 1930 from an image.

Referring to FIG. 19B, according to an exemplary embodiment, the device 100 may correspond the obtained plurality of images to a plurality of contact information items. For example, the device 100 may correspond the first image 1910 to a first contact information item 1950, the second image 1920 to a second contact information item 1960, and the third image 1930 to a third contact information item 1970, based on a user input. As another example, the device 100 may use the first image 1910 as an avatar image 1980 of the first contact information item 1950, the second image 1920 as an avatar image 1990 of the second contact information item 1960, and the third image 1930 as an avatar image 1995 of the third contact information item 1970, based on a user input.

Figure 20:
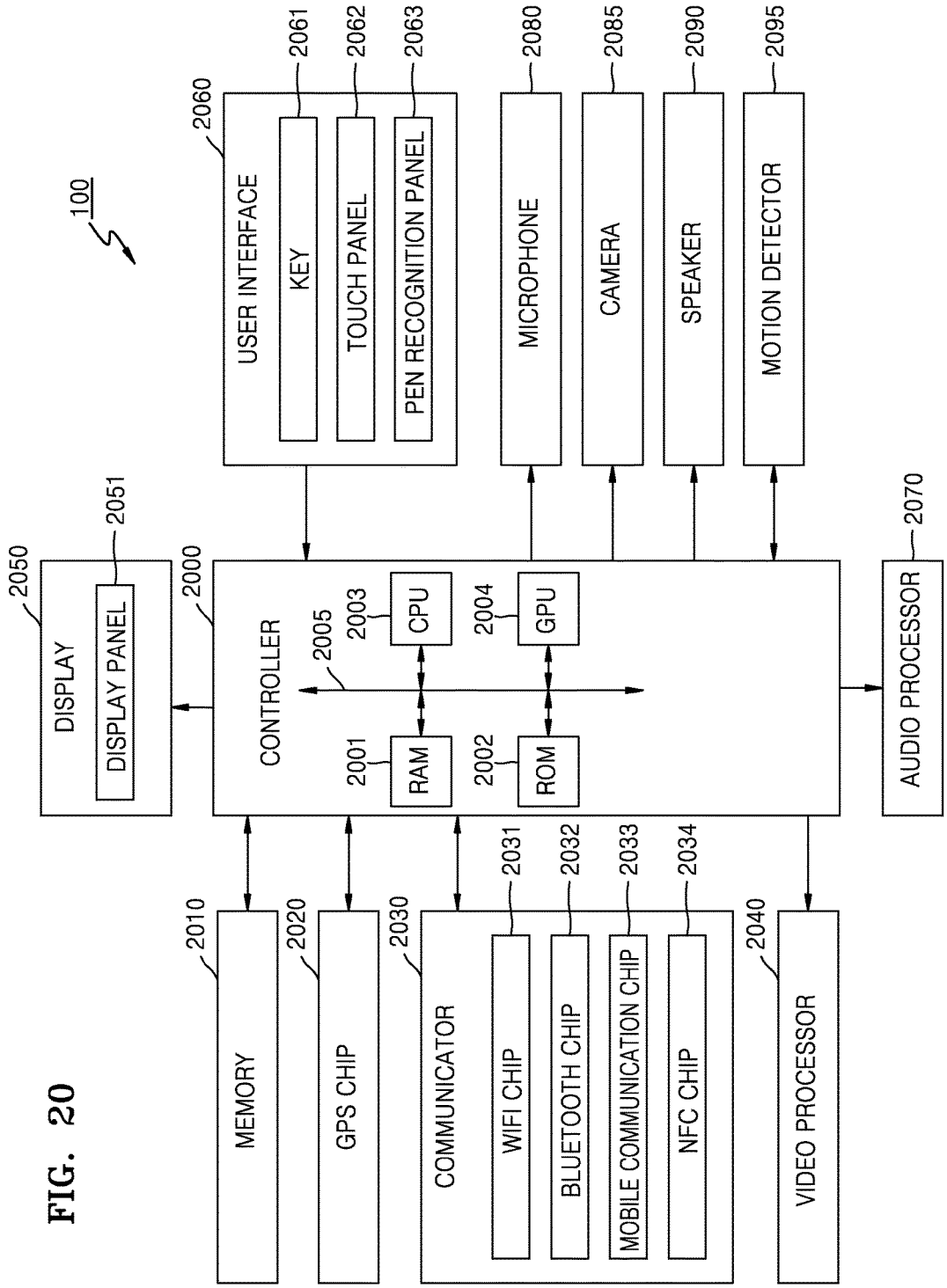
FIG. 20 is a block diagram illustrating a configuration of the device according to an exemplary embodiment.

FIG. 20 is a block diagram illustrating a configuration of the device 100 according to an exemplary embodiment.

Referring to FIG. 20, the device 100 may include at least one selected from the group consisting of a display 2050, a control unit 2000 (e.g., controller), a memory 2010, a GPS chip 2020, a communication unit 2030 (e.g., communicator), a video processor 2040, an audio processor 2070, a user input unit 2060 (e.g., user interface), a microphone 2080, a camera 2085, a speaker 2090, and a motion detector 2095.

The display 2050 may include a display panel 2051 and a controller for controlling the display panel 2051. The display panel 2051 may be configured as various types of a display such as a liquid-crystal display (LCD), an organic light-emitting diode (OLED) display, an active-matrix organic light-emitting diode (AMOLED) display, or a plasma display panel (PDP). The display panel 2051 may be implemented to be flexible, transparent, or wearable. The display 2050 and a touch panel 2062 included in the user interface 2060 may be combined with each other to constitute a touchscreen. For example, the touchscreen may include a module formed as one body in which the display panel 2051 and the touch panel 2062 form a layered structure.

The memory 2010 may include at least one selected from the group consisting of an internal memory and an external memory.

The internal memory may include, for example, at least one selected from the group consisting of a volatile memory (for example, dynamic random access memory (DRAM), static random access memory (RAM), synchronous DRAM (SDRAM), or the like), a non-volatile memory (for example, one-time programmable read-only memory (OTPROM), programmable read-only memory (PROM), erasable and programmable read-only memory (EPROM), electrically erasable and programmable read-only memory (EEPROM), mask read-only memory (ROM), flash ROM, or the like), a hard-disk drive (HDD), and a solid-state drive (SSD). According to an exemplary embodiment, the control unit 2000 (e.g., controller) may load a command or data, received from at least one selected from the group consisting of the non-volatile memory and other elements, to the volatile memory and process the command or data. The control unit 2000 may save data, received or generated from another element, in the non-volatile memory.

The external memory may include, for example, at least one selected from the group consisting of compact flash (CF), secure digital (SD), micro secure digital (micro-SD), mini secure digital (mini-SD), extreme digital (xD), and a memory stick, etc.

The memory 2010 may store various programs and data used for operation of the device 100. For example, the memory 2010 may temporarily or non-permanently store at least a part of content that is to be displayed on a lock screen.

The control unit 2000 may control the display 2050 to display a part of content, stored in the memory 2010, on the display unit 110. In other words, the control unit 2000 may display a part of the content stored in the memory 2010 on the display 2050. Alternatively, if a user gesture is performed on an area of the display 2050, the control unit 2000 may perform a control operation in correspondence with the user gesture.

The control unit 2000 may include at least one selected from the group consisting of a RAM 2001, a ROM 2002, a central processing unit (CPU) 2003, a graphic processing unit (GPU) 2004, and a bus 2005. The RAM 2001, the ROM 2002, the CPU 2003, and the GPU 2004 may be connected to each other via the bus 2005.

The CPU 2003 accesses the memory 2010, and performs booting by using an operating system (OS) stored in the memory 2010. The CPU 2003 performs various operations by using various programs, content, or data stored in the memory 2010.

The ROM 2002 stores a command set for system booting. As an example, if a turn-on command is input and power is supplied to the device 100, the CPU 2003 may copy the OS stored in the memory 2010 to the RAM 2001 according to the command stored in the ROM 2002, and boot the system by executing the OS. When the booting is completed, the CPU 2003 copies various programs stored in the memory 2010 to the RAM 2001, and executes the programs copied to the RAM 2001 to perform various operations. When the booting of the device 100 is completed, the GPU 2004 displays a user interface (UI) screen on an area of the display 2050. In detail, the GPU 2040 may generate a screen on which an electronic document that includes various objects such as content, an icon, a menu, or the like is displayed. The GPU 2040 calculates attribute values such as a coordinate value, a shape, a size, or a color with respect to each object, according to a layout of the screen. Then, the GPU 2040 may generate a screen having various types of layout that includes an object, based on the calculated attribute value. The screen generated by the GPU 2004 may be provided to the display 2050, and displayed on an area of the display 2050.

The GPS chip 2050 may receive a GPS signal from a GPS satellite, and calculate a current location of the device 100. The control unit 2000 may calculate a location of a user by using the GPS chip 2020, if a navigation program is used or a current location of the user is to be determined.

The communication unit 2030 may perform communication with various types of external devices according to various types of communication methods. The communication unit 2030 may include at least one selected from the group consisting of a WiFi chip 2031, a BLUETOOTH chip 2032, a wireless communication chip 2033, and an NFC chip 2034. The control unit 2000 may perform communication with various external devices by using the communication unit 2030.

The WiFi chip 2031 and the BLUETOOTH chip 2032 may respectively perform communication by using a WiFi method and a BLUETOOTH method. If the WiFi chip 2031 or the BLUETOOTH chip 2032 is employed, various connection information, such as a service set identifier (SSID), a session key, etc., is transceived in advance. Then, communication is performed by using the connection information to receive and transmit a variety of information. The wireless communication chip 2033 refers to a chip for performing communication according to various communication standards such as institute of electrical and electronics engineers (IEEE), ZIGBEE, $3^{rd}$ generation (3G), $3^{rd}$ generation partnership project (3GPP), long-term evolution (LTE), and the like. The NFC chip 2034 refers to a chip that operates according to an NFC method by using 13.56 MHz, from among various radio frequency identification (RFID) frequency bands such as 135 kHz, 13.56 MHz, 433 MHz, 860 to 960 MHz, 2.45 GHz, etc.

The video processor 2040 may process video data included in content received via the communication unit 2030 or content stored in the memory 2010. The video processor 2040 may perform various image processing techniques, such as decoding, scaling, noise filtering, a frame rate conversion, or a resolution conversion, on the video data.

The audio processor 2070 may process audio data included in content received via the communication unit 2030 or content stored in the memory 2010. The audio processor 2070 may perform various processing techniques, such as decoding, amplification, or noise filtering, on the audio data.

If a playback program of multimedia content is executed, the control unit 2000 may play the multimedia content by driving the video processor 2040 and the audio processor 2070. The speaker unit 2090 may output audio data generated by the audio processor 2070.

The user input unit 2060 may receive an input of various commands from a user. The user input unit 2060 may include at least one selected from the group consisting of a key 2061, a touch panel 2060, and a pen recognition panel 2063.

The key 2061 may be various types of key such as a mechanical button or a wheel, which is formed on various areas such as at a front, a side, or a rear of an outer surface of the device 100.

The touch panel 2062 may detect a touch input by a user and output a touch event value corresponding to a signal of the detected touch input. If the touch panel 2062 and the display panel 2051 are combined with each other to constitute a touchscreen, the touchscreen may be implemented by using various types of touch sensors such as a capacitive type, a resistive type, and/or a piezoelectric type. The capacitive touchscreen is formed by using a method of detecting micro-electricity generated from a body of a user when a part of the body of the user touches a surface of the touchscreen and calculating a coordinate of the touched location, by using a dielectric material coated on a surface of the touchscreen. The resistive touchscreen is formed by using a method of detecting current flowing when, if a user touches a touchscreen that includes two built-in electrode plates, an upper electrode plate and a lower electrode plate between the two built-in electrode plates contact each other at a touched location of the touchscreen, and calculating a coordinate of the touched location of the touchscreen. A touch event that occurs on the touchscreen may be generated mainly by a finger of a person, but may also be generated by a conductive material that may change electrostatic capacity.

A pen recognition panel 2063 may detect a proximity input or a touch input of a touch pen used by a user (e.g., a stylus pen or a digitizer pen), and output an event of the detected proximity input or the detected touch input of the touch pen. The pen recognition panel 2063 may be implemented, for example, by using an electromagnetic radiation (EMR) method and detect a touch input or a proximity input according to a change in strength of an electromagnetic field as the touch pen is near or touches the pen recognition panel. The pen recognition panel 2063 may include an electromagnetic induction coil sensor having a grid structure and an electric signal processor providing an alternating current (AC) signal to the electromagnetic induction coil sensor. If a pen having a resonant circuit is placed in a vicinity of a loop coil of the pen recognition panel 2063, a magnetic field transmitted from the loop coil generates current based on mutual electromagnetic induction through the resonant circuit of the pen. Based on the current, an induction field may be generated from the coil of the resonant circuit in the pen, and the pen recognition panel 2063 may detect the induction field in a loop coil that is in a signal reception state, thereby sensing a proximity location or a touch location of the pen. The pen recognition panel 2063 may be located below the display panel 2051 to have a certain area, for example, an area that may cover a display area of the display panel 2051.

The microphone 2080 may receive an input of user voice or other sound and convert the user voice or the other sound into audio data. The control unit 2000 may use user voice, input via the microphone 2080, for a phone call operation, or convert the user voice into audio data and store the user voice in the memory 2010.

The camera 2085 may capture a still image or a moving image according to control by a user. A plurality of cameras 2085 such as a front camera and a rear camera may be included.

If the photographing unit 2085 (e.g., camera) and the microphone unit 2080 are provided, the control unit 2000 may perform control operation according to user voice input via the microphone unit 2080 or a motion of a user recognized by the photographing unit 2085. For example, the device 100 may operate in a motion control mode or a voice control mode. If the device 100 operates in the motion control mode, the control unit 2000 may activate the photographing unit 2085 to capture an image of the user, track a change in the motion of the user, and then, perform control operation corresponding to the change in the motion of the user. If the device 100 operates in the voice control mode, the control unit 2000 may operate in a voice recognition mode in which user voice input via the microphone unit 2080 is analyzed, and a control operation is performed according to the analyzed user voice.

The motion detection unit 2095 may detect movement of a main body of the device 100. The device 100 may be rotate or tilted in various direction. The motion detection unit 2095 may detect movement characteristics such as a rotation direction, an angle, or an inclination by using at least one selected from the group consisting of various sensors such as a geo-magnetic sensor, a gyroscope sensor, and an acceleration sensor.

Additionally, according to an exemplary embodiment, the device 100 may further include at least one of a universal serial bus (USB) port to which a USB connector may be connected, various external input ports for connecting to various external terminals for a headset, a mouse, or a LAN, a digital multimedia broadcasting (DMB) chip for receiving and processing a DMB signal, and various sensors. It may be further understood that some elements may not be included, or additional elements may be further included.

Figure 21:
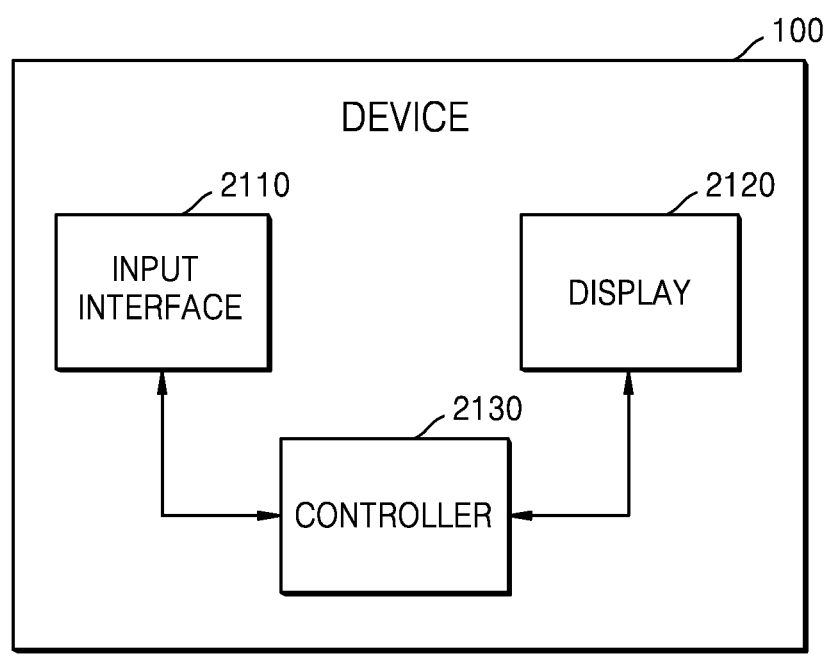
FIG. 21 is a block diagram of a device according to an exemplary embodiment.

FIG. 21 is a block diagram illustrating a configuration of the device 100 according to an exemplary embodiment.

Referring to FIG. 21, the device 100 may include an input unit 2110 (e.g., input interface), a display 2120, and a control unit 2130 (e.g., controller). However, the device 100 may be implemented by using more or less elements than those shown in FIG. 21.

The device 100 is a device that may perform the image displaying method, described with reference to FIGS. 1 through 19, and may implement all exemplary embodiments for performing the image displaying method described with reference to FIGS. 1 through 19.

Hereinafter, the elements are sequentially described.

According to an exemplary embodiment, the input unit 2110 may receive an input from outside of the device 100. For example, the input unit 2110 may receive a user input.

According to an exemplary embodiment, the input unit 2110 may receive at least one selected from the group consisting of a touch input, a keyboard input, a mouse input, a button input, a gesture input, and a multimodal input.

According to an exemplary embodiment, the input unit 2110 may include at least one selected from the group consisting of a camera, an infrared light sensor, a microphone, a touch panel, a gravity sensor, an acceleration sensor, a mouse, and a keyboard.

According to an exemplary embodiment, the input unit 2110 may determine an input method. For example, the input unit 2110 may determine an input method according to a type of an input received from a user. The device 100 may determine a method of receiving a user input according to the determined input method.

For example, if the input unit 2110 recognizes a touch input to the device 100, the input unit 2110 may determine a touch input method as an input method. If the input unit 2110 determines the touch input method as the input method, the input unit 2110 may receive a touch input via a touchscreen included in the input unit 2110.

As another example, if the input unit 2110 recognizes a click input to the device 100, the input unit 2110 may determine a click input method as an input method. If the input unit 2110 determines the click input method as the input method, the input unit 2110 may receive a click input via a mouse included in the input unit 2110.

As another example, if the input unit 2110 recognizes a keyboard input to the device 100, the input unit 2110 may determine a keyboard input method as an input method. If the input unit 2110 determines the keyboard input method as the input method, the input unit 2110 may receive a keyboard input via a keyboard included in the input unit 2110.

According to an exemplary embodiment, the input unit 2110 may receive a user input of obtaining an image displayed on the display 2120. A user input may refer to an input received from a user. For example, a user input may include at least one selected from the group consisting of a touch input, a keyboard input, a sound input, and a button input. As another example, a user input may include a touch input or a drag input via a mouse input. As another example, a user input may include an input of selecting one of a plurality of object images displayed on the display 2120.

According to an exemplary embodiment, the display 2120 may display a screen. For example, the display 2120 may display one or more windows. As another example, the display 2120 may display an obtained image. As another example, the display 2120 may edit an obtained image and display the edited obtained image. As another example, the display 2120 may display a contact information list.

According to an exemplary embodiment, the control unit 2130 may obtain an image based on a user input.

According to an exemplary embodiment, the input unit 2110 may receive a user input. A user input may refer to an input received from a user. For example, a user input may include at least one selected from the group consisting of a touch input, a keyboard input, a sound input, and a button input.

According to an exemplary embodiment, the control unit 2130 may obtain an image based on the received user input. For example, the device 100 may receive an input of selecting a certain area of the screen, and obtain an image display on the area selected based on the selecting input.

According to an exemplary embodiment, the control unit 2130 activates an application when the obtained image is displayed on a foreground of the display 2120, and display the activated application to overlap with the obtained image. The activated application may be an application that employs the obtained image.

Activation may refer to a state of selection according to a user input. For example, if a first application is selected from among the first application and a second application according to a user's click input, the first application may be displayed on a layer above a layer of the second application.

According to an exemplary embodiment, the control unit 2130 may display the obtained image on the display 2120. If the control unit 2130 displays an activated application when the obtained image is displayed on a foreground of the display 2120, the device 100 may display the obtained image to overlap with the activated application.

The activated application may be determined from among one or more applications, based on a user input. For example, the device 100 may determine a phone call application, used for a phone call, as an application that employs the obtained image, and display the determined phone call application.

According to an exemplary embodiment, the control unit 2130 may display the obtained image to overlap with an area in which the activated application is displayed.

For example, the control unit 2130 may display the obtained image to overlap with an area in which a phone call application that is an activated application is displayed. The obtained image, instead of the phone call application, may be displayed on an area in which an area in which the phone call application is displayed overlaps with an area in which the obtained image is displayed. Alternately, the obtained image may be displayed translucently on an area in which the obtained image overlaps with the phone call application.

Additionally, the activated application may be an application that uses the obtained image. For example, if the activated application is a phone call application, the obtained image may be used as an image indicating a certain contact information item, from among contact information items included in the phone call application.

The control unit 2130 may determine an application that uses the image obtained by the input unit 2110, from one or more applications, and the display 2120 may display the determined application.

For example, the control unit 2130 may determine a phone call application, used for a phone call, as an application that employs the obtained image, and the display 2120 may display the determined phone call application.

The control unit 2130 may control the display 2120 to display the obtained image overlapping an area in which the determined application is displayed.

For example, the control unit 2130 may control the display 2120 to display the obtained image that is an image obtained from a selected area to overlap with an area in which a phone call application is displayed. The obtained image, instead of the phone call application, may be displayed on the area that overlaps with the obtained image.

According to an exemplary embodiment, the control unit 2130 may control the display 2120 to display an application determined by using the obtained image. For example, if the determined application is a phone call application, the obtained image may be used as an image representing a certain contact information item, from among contact information items included in the phone call application.

The control unit 2130 may determine one or more contact information items, from a plurality of contact information items included in a contact information list displayed via a user communication application, based on a user input.

According to an exemplary embodiment, the controller 2130 may control the display 2120 to display the user communication application. The display 2120 may display a plurality of contact information items via the displayed user communication application. One or more contact information items may be determined from the displayed plurality of contact information items, based on a user input. For example, a contact information item may be selected from among the plurality of contact information items according to a touch input by a user.

The control unit 2130 may set the obtained image as an avatar image used to identify the determined contact information item.

A contact information item may include a representative image representing the contact information item. For example, a contact information item may include an image and contact information. An image representing a contact information item may be an avatar image. According to an exemplary embodiment, the control unit 2130 may determine an obtained image as an avatar image used to identify the determined contact information item.

The control unit 2130 may control the display 2120 to display the contact information item that includes the set avatar image.

The control unit 2130 may determine a background color of the obtained image by using a predetermined method.

According to an exemplary embodiment, the control unit 2130 may determine a background color of an obtained image. For example, the device 100 may determine a background color of an obtained image based on a color of an outermost area of the obtained image. For example, if a color of a border of an obtained image is white, the device 100 may determine white as a background color of the obtained image.

According to an exemplary embodiment, the control unit 2130 may edit the obtained image by using the determined background color.

For example, the control unit 2130 may edit the obtained image to have a predetermined size by filling a background of the obtained image with the determined background color. The predetermined size may be a size of an avatar image included in a contact information item.

As another example, if the image obtained by the control unit 2130 has a size of 100×100 pixels and the determined background color is white, the obtained image may be edited to have a size of 200×200 pixels by filling a background of the obtained image with a white color.

According to an exemplary embodiment, the control unit 2130 may set the edited image as an avatar image.

For example, according to an exemplary embodiment, the control unit 2130 may determine a contact information item from a plurality of contact information items based on a user input, and substitute an avatar image included in the determined contact information item with the edited image. The control unit 2130 may control the display 2120 to display the edited image on an area of the avatar image included in the determined contact information item.

According to an exemplary embodiment, the input unit 2110 receives an image-obtaining input of selecting a part or a whole screen of the device 100.

For example, the input unit 2110 may receive an image-obtaining input of selecting a part of a screen of the device 100 via a touch input by a user.

As another example, the input unit 2110 may receive an image-obtaining input of selecting a part of a screen of the device 100 via a drag input to the screen by a user.

According to an exemplary embodiment, the control unit 2130 obtains an image in a selected area which is determined based on the received image-obtaining input.

For example, the control unit 2130 may obtain an image in a rectangular area having a coordinate from which a touch input by a user starts and a coordinate at which the touch input by the user ends as both ends of a diagonal line of the rectangular area.

As another example, the control unit 2130 may obtain an image in a closed curve area obtained via a drag input by a user.

Alternately, a method of obtaining an image in a selected area of a screen via a user input may be employed.

According to an exemplary embodiment, the control unit 2130 may control the display 2120 to determine an application using the obtained image, from among one or more applications, and display the determined application.

For example, the control unit 2130 may control the display 2120 to display a phone call application determined based on a user input, from among a plurality of applications. The phone call application may be an application using the obtained image. For example, the obtained image may be used as an avatar image representing one of the displayed contact information items included in the phone call application.

According to an exemplary embodiment, the control unit 2130 may determine whether the obtained image is covered by an area on which the determined application is displayed.

According to an exemplary embodiment, the control unit 2130 may determine whether an area, which is covered when the obtained image is displayed on the screen, is present. For example, if a part of an area of the obtained image is covered by the determined application, the part of the area of the obtained image may not be displayed. The control unit 2130 may determine whether the part of the area of the obtained image is covered by the application.

According to an exemplary embodiment, if the obtained image is covered by the area on which the determined application is displayed, the control unit 2130 may control the display 2120 to display the obtained image to overlap with the area on which the determined application is displayed.

According to an exemplary embodiment, if the control unit 2130 determined that the obtained image is covered by the area on which the determined application is displayed, the control unit 2130 may control the display 2120 to display the obtained image to overlap with an area on which the determined application is displayed. The obtained image may be displayed on an area in which the obtained image overlaps with the area on which the determined application is displayed.

One or more exemplary embodiments can be embodied in the form of a recording medium containing commands implementable by a computer such as a program module executed by a computer. The computer-readable recording medium may be any medium accessible by a computer and includes any of volatile and non-volatile medium and separable and non-separable medium. Furthermore, the computer readable medium may include all of computer storage medium and communication medium. The computer storage medium includes any of the volatile and non-volatile medium and separable and non-separable medium embodied by any method or technology for storing information such as a computer-readable command, a data structure, a program module or other data. The communication medium includes a computer readable command, a data structure, a program module or other data of a modulated data signal such as carrier wave, or other transmission mechanisms, and includes any information transmission medium.

It may be understood that the exemplary embodiments described herein should be considered in a descriptive sense only and not for purposes of limitation. Descriptions of features or aspects within each exemplary embodiment should be considered as available for other similar features or aspects in other exemplary embodiments. For example, each component described in singular form may be executed in a distributed form Likewise, components described in a distributed form may be executed in a combined form.

While one or more exemplary embodiments have been described with reference to the figures, it will be understood by those of ordinary skill in the art that various changes in form and details may be made therein without departing from the spirit and scope as defined by the following claims.

What is claimed is:

1. A communication device configured to display an image, the communication device comprising:
  a display;
  a user interface configured to obtain a first user input for selecting an image that is displayed in a first window, which is a background image, on the display; and
  at least one processor configured to:
    select the image based on the first user input,
    activate an application based on a second user input for activating the application, and
    control the display to display the selected image to partially overlap at least one contact information item among a plurality of contact information items included in a contact information list of the activated application such that the selected image and the plurality of contact information items are visible at the same time and the selected image blocks part of the at least one contact information item of the plurality of contact information items,
  wherein the plurality of contact information items is displayed in a second window, which is displayed overlapping the background image before the selected image is displayed to partially overlap the at least one contact information item.

2. The communication device of claim 1, wherein the application comprises a communication application that is used for communicating with an external device.

3. The communication device of claim 2, wherein the at least one processor is further configured to set the selected image as an avatar image for the contact information item that the selected image is overlapping.

4. The communication device of claim 3, wherein the display is configured to display the contact information item that includes the set avatar image.

5. The communication device of claim 3, wherein the at least one processor is further configured to determine a background color of the selected image based on a color of an outermost area of the selected image,
  edit the selected image by filling a background of the selected image with the determined background color, and
  set the edited image as the avatar image.

6. The communication device of claim 1, wherein the user interface is configured to receive an image-selecting input for selecting a part of a screen of the communication device, and
  the at least one processor is further configured to select the image of the selected part of the screen which is determined based on the received image-selecting input.

7. The communication device of claim 1, wherein the user interface is configured to receive an object selection input of selecting at least one object image of a plurality of object images displayed on the display.

8. The communication device of claim 1, wherein the first user input comprises an input of selecting a part of a screen displayed on the display.

9. The communication device of claim 1, wherein the selecting the image comprises selecting a part of a screen displayed on the display based on the first user input, and editing the image in the selected part of the screen.

10. The communication device of claim 9, wherein the editing of the image in the selected part of the screen comprises at least one selected from the group consisting of an operation of resizing the image in the selected part of the screen and an operation of resetting a width-to-length ratio of the image in the selected part of the screen.

11. The communication device of claim 1, wherein the at least one processor is configured to select a rectangular area having a coordinate from which the first user input starts and a coordinate at which the first user input ends as both ends of a diagonal line of the rectangular area.

12. A method of displaying an image, which is performed by a communication device, the method comprising:
  obtaining a first user input of selecting an image displayed in a first window, which is a background image, on a display included in the communication device;
  selecting, by at least one processor of the communication device, the image based on the first user input; and
  activating, by the at least one processor, an application based on a second user input for activating the application, and controlling, by the at least one processor, to display the selected image to partially overlap at least one contact information item among a plurality of contact information items included in a contact information list of the activated application such that the selected image and the plurality of contact information items are visible at the same time and the selected image blocks part of the at least one contact information item of the plurality of contact information items,
  wherein the plurality of contact information items is displayed in a second window, which is displayed overlapping the background image before the selected image is displayed to partially overlap the at least one contact information item.

13. The method of claim 12, wherein the application comprises a communication application that is used for communicating with an external device.

14. The method of claim 13, further comprising:
  setting, by the at least one processor, the selected image as an avatar image for the contact information item that the selected image is overlapping.

15. The method of claim 14, further comprising controlling, by the at least one processor, to display the contact information item that includes the set avatar image.

16. The method of claim 14, wherein the setting, by the at least one processor the selected image as the avatar image comprises:
  determining, by the at least one processor, a background color of the selected image based on a color of an outermost area of the selected image,
  editing, by the at least one processor, the selected image by filling a background of the selected image with the determined background color, and
  setting, by the at least one processor, the edited image as the avatar image.

17. The method of claim 12, wherein the first user input comprises selecting a part of a screen displayed on the display.

18. The method of claim 12, wherein the first user input comprises an input of selecting at least one object image of a plurality of object images displayed on the display.

19. The method of claim 12, wherein the selecting, by the at least one processor, the image comprises selecting, by the at least one processor, a rectangular area having a coordinate from which the first user input starts and a coordinate at which the first user input ends as both ends of a diagonal line of the rectangular area.

20. A non-transitory computer-readable recording storage medium having stored thereon a computer program which, when executed by a computer, performs the method of claim 12.

* * * * *